US010427394B2

(12) United States Patent
Nakajima et al.

(10) Patent No.: US 10,427,394 B2
(45) Date of Patent: Oct. 1, 2019

(54) METHOD FOR CURING RESIN COMPOSITION

(71) Applicant: OMRON CORPORATION, Kyoto-shi, Kyoto (JP)

(72) Inventors: Seiji Nakajima, Moriyama (JP); Yosuke Tatsuno, Kusatsu (JP); Mitsuo Ito, Kikuchi-gun (JP); Satoshi Hirono, Kusatsu (JP); Yuzo Morisaki, Kusatsu (JP); Junji Kawamoto, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 142 days.

(21) Appl. No.: 15/122,727

(22) PCT Filed: Nov. 6, 2014

(86) PCT No.: PCT/JP2014/079459
§ 371 (c)(1),
(2) Date: Aug. 31, 2016

(87) PCT Pub. No.: WO2015/136770
PCT Pub. Date: Sep. 17, 2015

(65) Prior Publication Data
US 2017/0066230 A1 Mar. 9, 2017

(30) Foreign Application Priority Data

Mar. 14, 2014 (JP) .................. 2014-052105

(51) Int. Cl.
B32B 37/12 (2006.01)
B32B 15/092 (2006.01)
(Continued)

(52) U.S. Cl.
CPC ............ *B32B 37/1207* (2013.01); *B32B 7/12* (2013.01); *B32B 15/09* (2013.01); *B32B 15/092* (2013.01);
(Continued)

(58) Field of Classification Search
CPC ..... B32B 37/1207; B32B 27/26; B32B 27/38; B32B 37/06
See application file for complete search history.

(56) References Cited

U.S. PATENT DOCUMENTS

2004/0074089 A1 4/2004 Gilleo
2008/0132131 A1* 6/2008 Tzou .................. B32B 5/24
442/146

(Continued)

FOREIGN PATENT DOCUMENTS

CN 102333808 A 1/2012
JP 2004-277701 A 10/2004
(Continued)

OTHER PUBLICATIONS

Extended European search report (EESR) dated Oct. 25, 2017 in a counterpart European patent application.

(Continued)

*Primary Examiner* — Christopher T Schatz
(74) *Attorney, Agent, or Firm* — Metroplex IP Law Group, PLLC

(57) ABSTRACT

The present invention provides a method with which curing can be carried out in a short time without a heat load on an adherend and a cured product having stable quality can be obtained. The resin composition curing method in accordance with the present invention includes the step (a) of directly and/or indirectly irradiating, with laser light, a resin composition (A) which contains (i) an epoxy resin, (ii) an encapsulated curing agent including a core that contains a curing agent and a shell that covers the core, (iii) a filler, and (iv) a color material.

7 Claims, 4 Drawing Sheets

(51) Int. Cl.
  B32B 27/16 (2006.01)
  B32B 27/20 (2006.01)
  B32B 27/26 (2006.01)
  B32B 27/38 (2006.01)
  B32B 7/12 (2006.01)
  B32B 15/09 (2006.01)
  C08K 3/04 (2006.01)
  C08K 3/36 (2006.01)
  C08K 3/40 (2006.01)
  C08K 5/00 (2006.01)
  C09J 5/00 (2006.01)
  C09J 11/00 (2006.01)
  C09J 163/00 (2006.01)
  C08L 63/00 (2006.01)
  C08G 59/18 (2006.01)
  C08G 59/24 (2006.01)
  C08G 59/50 (2006.01)
  C08G 59/68 (2006.01)
  B32B 27/08 (2006.01)
  B32B 27/36 (2006.01)
  B32B 38/00 (2006.01)
  C08K 3/22 (2006.01)
  C08J 3/24 (2006.01)
  C08K 7/20 (2006.01)
  B29C 35/08 (2006.01)

(52) U.S. Cl.
  CPC .............. *B32B 27/08* (2013.01); *B32B 27/16* (2013.01); *B32B 27/20* (2013.01); *B32B 27/26* (2013.01); *B32B 27/365* (2013.01); *B32B 27/38* (2013.01); *B32B 38/0008* (2013.01); *C08G 59/188* (2013.01); *C08G 59/245* (2013.01); *C08G 59/5033* (2013.01); *C08G 59/686* (2013.01); *C08J 3/241* (2013.01); *C08K 3/04* (2013.01); *C08K 3/22* (2013.01); *C08K 3/36* (2013.01); *C08K 3/40* (2013.01); *C08K 5/00* (2013.01); *C08K 7/20* (2013.01); *C08L 63/00* (2013.01); *C09J 5/00* (2013.01); *C09J 11/00* (2013.01); *C09J 163/00* (2013.01); *B29C 2035/0838* (2013.01); *B32B 2037/1253* (2013.01); *B32B 2250/02* (2013.01); *B32B 2250/244* (2013.01); *B32B 2255/10* (2013.01); *B32B 2255/26* (2013.01); *B32B 2264/101* (2013.01); *B32B 2264/102* (2013.01); *B32B 2307/302* (2013.01); *B32B 2307/402* (2013.01); *B32B 2310/0843* (2013.01); *B32B 2311/00* (2013.01); *B32B 2363/00* (2013.01); *B32B 2367/00* (2013.01); *B32B 2369/00* (2013.01); *B32B 2457/00* (2013.01); *B32B 2581/00* (2013.01); *C08J 2363/00* (2013.01); *C08K 2003/2265* (2013.01)

(56) References Cited

U.S. PATENT DOCUMENTS

| 2009/0076180 | A1 | 3/2009 | Iwaya |
| 2009/0273083 | A1* | 11/2009 | Sauciuc ................ H05K 3/321 257/741 |
| 2012/0089180 | A1* | 4/2012 | Fathi ................... B41J 2/17559 606/214 |

FOREIGN PATENT DOCUMENTS

| JP | 2006-282925 A | 10/2006 |
| JP | 2007-291252 A | 11/2007 |
| JP | 2008-247951 A | 10/2008 |
| JP | 2010-100760 A | 5/2010 |
| JP | 2011-194597 A | 10/2011 |
| JP | 2012-224733 A | 11/2012 |
| WO | 98/51960 A1 | 11/1998 |

OTHER PUBLICATIONS

English translation of the international preliminary report on patentability (Chapter I) of PCT/JP2014/079459 mailed by the International Bureau of WIPO dated Oct. 4, 2016.
Japanese Office Action dated Dec. 5, 2017 in a counterpart Japanese patent application.
Chinese Office Action dated Aug. 25, 2017 in the counterpart Chinese patent application.
International Search Report for PCT/JP2014/079459 dated Feb. 10, 2015.

* cited by examiner

METHOD FOR CURING RESIN COMPOSITION

TECHNICAL FIELD

The present invention relates to a method for curing a resin composition. Specifically, the present invention relates to a resin composition curing method with which curing can be carried out in a short time without placing a heat load on an adherend and a cured product having stable bonding quality can be obtained.

BACKGROUND ART

Conventionally, as a method (hereinafter, referred to as "sealing method") for sealing members in an electronic component or the like or as a method (hereinafter, referred to as "bonding method") for bonding members together in an electronic component or the like, the following methods and the like are known: that is, (1) a method in which a one-part epoxy resin adhesive agent is applied to a member and the adhesive agent is cured by heating; (2) a method in which a two-part epoxy resin adhesive agent is mixed and applied to a member, and is then cured by being left to stand; (3) a method in which a UV-curable adhesive agent is used; and (4) a method in which an instant adhesive agent is used.

Moreover, various techniques have been developed for dealing with different problems caused in a conventionally known sealing method or bonding method or in a conventionally known case where a sealing agent or adhesive agent is used.

For example, Patent Literature 1 discloses a technique in which, in order to prevent diffusion of heat energy generated by a curing reaction inside a curable resin composition in a complex in which the curable resin composition is attached onto metal or the like, a surface of a highly heat conductive member such as metal is coated with a material having low heat conductivity, a curable resin composition layer is formed thereon and is irradiated with energy, and thus continuous curing with the heat energy can be carried out. It is also disclosed in Patent Literature 1 that, in that case, an energy beam such as an ultraviolet ray (UV), an electron beam (EB), or a laser or heat energy or the like by conduction can be used.

Moreover, for example, Patent Literature 2 discloses an adhesive agent composition which contains a powder component such as a filler and can be stably applied without containing gas bubbles even in a case where an amount of the adhesive agent composition to be applied is small. Further, Patent Literature 2 discloses that the composition is cured by heat, and a microencapsulated cure-accelerating agent can be used as a component of the composition.

CITATION LIST

Patent Literature

[Patent Literature 1]
Japanese Patent Application Publication Tokukai No. 2011-194597 (Publication date: Oct. 6, 2011)
[Patent Literature 2]
Japanese Patent Application Publication Tokukai No. 2012-224733 (Publication date: Nov. 15, 2012)

SUMMARY OF INVENTION

Technical Problem

However, the methods (1) through (4) above have the following problems. The method of (1) has a problem of low productivity caused because a long time is required for the curing process. That is, a production process of an electronic component normally proceeds in a unit of seconds whereas, in the method of (1), the curing process requires approximately one hour and therefore components are retained (i.e., accumulated) in the curing process. This also causes a problem in the method of (1) that, in order to deal with the retention of components, it is necessary to enlarge production facilities.

Moreover, the method of (1) also has the following problem: that is, electronic components are to be left at a high temperature, and therefore a heat load is placed on a part other than the part in which the one-part epoxy resin adhesive agent has been applied. From this, in the method of (1), non-uniformity in performance may occur due to deformation. Further, the method of (1) also has a problem that a gas of the adhesive agent is generated by leaving the adhesive agent at the high temperature, and this may lower an electrical characteristic of a metal part.

In the method of (2), although a curing time is short, it is difficult to uniformly mix the two liquids. From this, there is a problem that stable bonding quality cannot be obtained. Moreover, curing starts immediately after the two liquids are mixed, and therefore the method of (2) has a problem that a work life is short and workability is extremely low. Further, in a case where a coating machine is used in the method of (2) in order to improve application accuracy, there is a problem that a nozzle is more likely to be clogged and a frequency of carrying out maintenance with respect to the coating machine is high.

In the method of (3), curing can be carried out at a low temperature and in a short time. However, an acid is contained in the UV-curable adhesive agent, and the acid remains in the resin even after curing. As a result, in a case where the UV-curable adhesive agent is applied to an electronic component, the acid causes corrosion of the electronic component. Therefore, the method of (3) has a problem that an obtained electronic component is to be extremely low in durability.

The method of (4) has problems that a work life is short and therefore workability is low, and bonding quality is not stable. Moreover, the method of (4) also has a problem that an obtained electronic component is low in durability.

Moreover, in the technique disclosed in Patent Literature 1, a cationic polymerization initiator is used and, from this, reactivity is low and this causes an inconvenience that physical properties of a cured product such as hardness are changed with time as a reaction gradually proceeds. Further, there is a concern in the technique disclosed in Patent Literature 1 as follows: that is, in a case where metal exists around the acid remaining inside, the acid may corrode a metal part around the acid.

Further, in the technique disclosed in Patent Literature 2, an ordinary curing method by heat is used, and a heat treatment is carried out for a long time, i.e., approximately one hour.

As such, conventionally, no method was found with which curing can be carried out in a short time without placing a heat load on an adherend and which can attain an object of obtaining a cured product having stable bonding quality.

The present invention is accomplished in view of the conventional problems, and its object is to provide a resin composition curing method with which curing can be carried out in a short time without placing a heat load on an adherend and a cured product having stable bonding quality can be obtained.

Solution to Problem

In order to attain the object, the inventors of the present invention have diligently studied about an optimal curing agent and an energy applying method that can draw the best performance out of the curing agent. As a result, the inventors of the present invention have found a method that can cure a resin composition at a low temperature and in a short time, and have thus accomplished the present invention.

That is, the resin composition curing method in accordance with the present invention includes the step of: (a) irradiating a resin composition (A) with laser light directly and/or indirectly, the resin composition (A) containing (i) an epoxy resin, (ii) an encapsulated curing agent including a core that contains a curing agent and a shell that covers the core, (iii) a filler, and (iv) a color material.

Advantageous Effects of Invention

The resin composition curing method in accordance with the present invention includes the step of: (a) irradiating a resin composition (A) with laser light directly and/or indirectly, the resin composition (A) containing (i) an epoxy resin, (ii) an encapsulated curing agent including a core that contains a curing agent and a shell that covers the core, (iii) a filler, and (iv) a color material.

From this, it is possible to carry out a curing reaction in an extremely short time and while significantly reducing a heat load on a part that is around a part to which the resin composition (A) has been applied. As a result, the resin composition curing method of the present invention brings about an effect of efficiently carrying out bonding or sealing of members in an electronic component with good quality.

DESCRIPTION OF EMBODIMENTS

Figure 1:
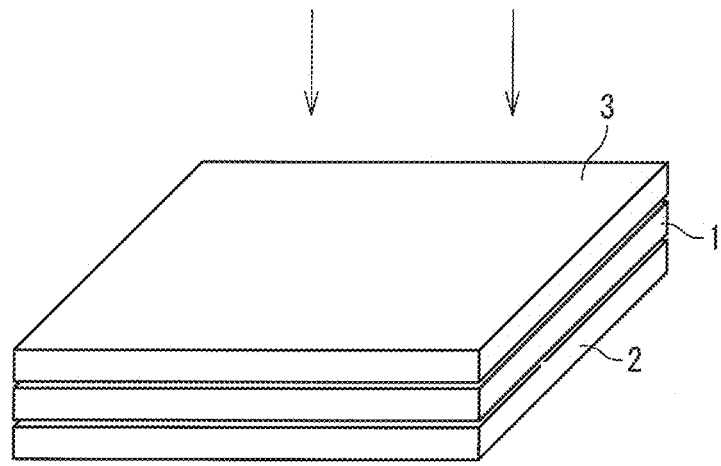
FIG. 1 is a view schematically illustrating a state in which (i) a resin composition (A) is applied to a surface of an adherend, (ii) a surface of another adherend is attached onto the resin composition (A), and (iii) an upper surface of the another adherend is irradiated with laser light.

The following description will discuss embodiments of the present invention. In the descriptions below, the same reference numerals are given to components which are identical in name and in function. Such components are not repeatedly described in detail.

Embodiment 1

A resin composition curing method in accordance with Embodiment 1 includes the step of: (a) irradiating a resin composition (A) with laser light directly and/or indirectly, the resin composition (A) containing (i) an epoxy resin, (ii) an encapsulated curing agent including a core that contains a curing agent and a shell that covers the core, (iii) a filler, and (iv) a color material.

(1. Epoxy Resin)

The epoxy resin is preferably an epoxy resin that is in a form of liquid at around a room temperature (e.g., 25° C.). As later described, the epoxy resin is cured by reaction with a curing agent contained in an encapsulated curing agent when the resin composition (A) is directly and/or indirectly irradiated with laser light and the encapsulated curing agent is cleaved. By considering that an obtained cured product may be used in an electronic component, the epoxy resin is used in the present invention in order to secure resistance to high temperature.

The epoxy resin can be any of epoxy resins which are used in conventionally known one-part epoxy resin compositions. For example, it is possible to use a compound in which two or more epoxy groups are bonded to a terminal of a benzene ring, an aromatic ring such as a naphthalene ring, or a hydrogenated aromatic ring such as a hydrogenated benzene ring.

Here, an alkyl group or a substituent group such as halogen can be bonded to the aromatic ring or to the hydrogenated aromatic ring. Moreover, the epoxy group can be bonded to the aromatic ring or the hydrogenated aromatic ring via oxyalkylene, poly(oxyalkylene), carbooxyalkylene, carbopoly(oxyalkylene), aminoalkylene, or the like.

In a case where the epoxy resin has a plurality of aromatic rings and/or a plurality of hydrogenated aromatic rings, the aromatic rings and/or hydrogenated aromatic rings can be bonded together directly or via an alkylene group, an oxyalkylene group, a poly(oxyalkylene) group, or the like.

Examples of the epoxy resin specifically encompass bisphenol A diglycidyl ether, bisphenol F diglycidyl ether, bisphenol A ethylene oxide 2-mole adduct diglycidyl ether, bisphenol A-1,2-propylene oxide 2-mole adduct diglycidyl ether, hydrogenated bisphenol A diglycidyl ether, hydrogenated bisphenol F diglycidyl ether, orthophthalic diglycidyl ester, tetrahydroisophthalic acid diglycidyl ester, N,N-diglycidyl aniline, N,N-diglycidyl toluidine, N,N-diglycidyl aniline-3-glycidyl ether, tetraglycidyl meta-xylenediamine, 1,3-bis(N,N-diglycidylaminomethylene)cyclohexane, tetrabromobisphenol A diglycidyl ether, and the like. These compounds can be used alone or in combination of two or more of these.

Among these, in view of excellent resistance to high temperature of a cured product, the epoxy resin is more preferably bisphenol A diglycidyl ether, hydrogenated bisphenol A diglycidyl ether, bisphenol F diglycidyl ether, or hydrogenated bisphenol F diglycidyl ether.

(2. Encapsulated Curing Agent)

In the method in accordance with Embodiment 1, it is important to use the encapsulated curing agent which includes (i) the core that contains the curing agent and (ii) the shell that covers the core. The resin composition (A) contains the encapsulated curing agent, and therefore it is possible to finish a curing reaction of the epoxy resin in an extremely short time by irradiation with laser light.

The curing agent contained in the core is preferably one or more curing agents selected from the group consisting of an amine compound, an imidazole compound, and a thiol compound.

(2-1. Amine Compound)

The amine compound can be an ordinarily used amine curing agent such as an amine adduct curing agent, a modified polyamine curing agent, an aliphatic polyamine curing agent, a heterocyclic polyamine curing agent, an alicyclic polyamine curing agent, an aromatic amine curing agent, a polyamideamine curing agent, a ketimine curing agent, a urethaneamine curing agent, or the like. These amine curing agents can be used alone or in combination of two or more of these. In a case where the amine curing agents are used in combination, ratios of the amine curing agents can be arbitrarily determined. Among these, from the viewpoint of moderate reactivity and stability, it is preferable to use an amine curing agent which is a mixture containing a low-molecular amine compound (a1) and an amine adduct.

Note, however, that the low-molecular amine compound (a1) can be used alone. Moreover, low-molecular amine compounds (a1) exemplified below can be used alone or in combination of two or more of those. In a case where the low-molecular amine compounds (a1) are used in combination, ratios of the low-molecular amine compounds (a1) can be arbitrarily determined.

Examples of the low-molecular amine compound (a1) encompass a compound which has at least one primary amino group and/or secondary amino group and does not have a tertiary amino group; a compound which has at least one tertiary amino group and at least one active hydrogen group; and the like.

Examples of the compound which has at least one primary amino group and/or secondary amino group and does not have a tertiary amino group encompass primary amines having no tertiary amino group such as methylamine, ethylamine, propylamine, butylamine, ethylenediamine, propylenediamine, hexamethylenediamine, diethylenetriamine, triethylenetetramine, ethanolamine, propanolamine, cyclohexylamine, isophoronediamine, aniline, toluidine, diaminodiphenylmethane, and diaminodiphenyl sulfone; secondary amines having no tertiary amino group such as dimethylamine, diethylamine, dipropylamine, dibutylamine, dipentylamine, dihexylamine, dimethanolamine, diethanolamine, dipropanolamine, dicyclohexylamine, piperidine, piperidone, diphenylamine, phenylmethylamine, and phenylethylamine.

Examples of the compound which has at least one tertiary amino group and at least one active hydrogen group encompass aminoalcohols such as 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, methyldiethanolamine, triethanolamine, and N-β-hydroxyethylmorpholine; aminophenols such as 2-(dimethylaminomethyl)phenol, and 2,4,6-tris(dimethylaminomethyl)phenol; tertiary aminoamines such as dimethylaminopropylamine, diethylaminopropylamine, dipropylaminopropylamine, dibutylaminopropylamine, dimethylaminoethylamine, diethylaminoethylamine, dipropylaminoethylamine, dibutylaminoethylamine, N-methylpiperazine, N-aminoethylpiperazine, and diethylaminoethylpiperazine; aminomercaptans such as 2-dimethylaminoethanethiol, 2-mercaptobenzoimidazole, 2-mercaptobenzothiazole, 2-mercaptopyridine, and 4-mercaptopyridine; aminocarboxylic acids such as N,N-dimethylaminobenzoic acid, N,N-dimethylglycine, nicotinic acid, isonicotinic acid, and picolinic acid; and aminohydrazides such as N,N-dimethylglycine hydrazide, nicotinic acid hydrazide, and isonicotinic acid hydrazide. The compound which has at least one tertiary amino group and at least one active hydrogen group is preferably one or more compounds selected from the group consisting of the above compounds.

The amine adduct can be used alone or can be mixed with the low-molecular amine compound (a1) as above described. Examples of the amine adduct encompass compounds which have an amino group and are obtained by reaction of an amine compound (a2) and one or more compounds selected from the group consisting of a carboxylic acid compound, a sulfonic acid compound, a urea compound, an isocyanate compound, and an epoxy resin (e1).

The amine compound (a2) can be any of the amine compounds above exemplified as the low-molecular amine compound (a1).

Among the amine adducts, it is particularly preferable to employ the amine adduct that is obtained by reaction of the epoxy resin (e1) and the amine compound (a2). The amine adduct that is obtained by reaction of the epoxy resin (e1) and the amine compound (a2) is preferable also because an unreacted amine compound (a2) can be used as a low-molecular amine compound (a1).

Examples of the carboxylic acid compound encompass succinic acid, adipic acid, sebacic acid, phthalic acid, dimer acid, and the like. Examples of the sulfonic acid compound encompass ethanesulfonic acid, p-toluenesulfonic acid, and the like. Examples of the urea compound encompass urea, methylurea, dimethylurea, ethylurea, t-butylurea, and the like.

Examples of the isocyanate compound encompass aliphatic diisocyanate, alicyclic diisocyanate, aromatic diisocyanate, aliphatic triisocyanate, polyisocyanate, and the like.

Examples of aliphatic diisocyanate encompass ethylenediisocyanate, propylenediisocyanate, butylenediisocyanate, hexamethylenediisocyanate, trimethylhexamethylenediisocyanate, and the like.

Examples of alicyclic diisocyanate encompass isophoronediisocyanate, 4,4'-dicyclohexylmethanediisocyanate, norbornanediisocyanate, 1,4-isocyanatocyclohexane, 1,3-bis(isocyanatomethyl)-cyclohexane, 1,3-bis(2-isocyanatopropyl-2-yl)-cyclohexane, and the like.

Examples of aromatic diisocyanate encompass tolylenediisocyanate, 4,4'-diphenylmethanediisocyanate, xylenediisocyanate, 1,5-naphthalenediisocyanate, and the like.

Examples of aliphatic triisocyanate encompass 1,6,11-undecanetriisocyanate, 1,8-diisocyanate-4-isocyanatemethyloctane, 1,3,6-triisocyanatemethylhexane, and the like.

Examples of polyisocyanate encompass polymethylenepolyphenylpolyisocyanate, polyisocyanate derived from the diisocyanate compound, and the like. Examples of polyisocyanate derived from diisocyanate encompass isocyanurate type polyisocyanate, buret type polyisocyanate, urethane type polyisocyanate, allophanate type polyisocyanate, carbodiimide type polyisocyanate, and the like.

Examples of the epoxy resin (e1) encompass a monoepoxy compound, a polyvalent epoxy compound, a mixture thereof, and the like.

Examples of the monoepoxy compound encompass butyl glycidyl ether, hexyl glycidyl ether, phenyl glycidyl ether, allyl glycidyl ether, para-tert-butylphenyl glycidyl ether, ethylene oxide, propylene oxide, paraxylyl glycidyl ether, glycidyl acetate, glycidyl butyrate, glycidyl hexoate, glycidyl benzoate, and the like.

The polyvalent epoxy compound encompass bisphenol type epoxy resins which are obtained by glycidylating bisphenols such as bisphenol A, bisphenol F, bisphenol AD, bisphenol S, tetramethylbisphenol A, tetramethylbisphenol F, tetramethylbisphenol AD, tetramethylbisphenol S, tetrabromobisphenol A, tetrachlorobisphenol A, and tetrafluorobisphenol A; epoxy resins which are obtained by glycidylating other dihydric phenols such as biphenol, dihydroxynaphthalene, and 9,9-bis(4-hydroxyphenyl)fluorene; epoxy resins which are obtained by glycidylating trisphenols such as 1,1,1-tris(4-hydroxyphenyl)methane and 4,4-(1-(4-(1-(4-hydroxyphenyl)-1-methylethyl)phenyl)ethylidene)bisphenol; epoxy resins which are obtained by glycidylating tetrakisphenols such as 1,1,2,2,-tetrakis(4-hydroxyphenyl)ethane; novolac type epoxy resins which are obtained by glycidylating novolacs such as phenol novolac, cresol novolac, bisphenol A novolac, brominated phenol novolac, and brominated bisphenol A novolac; an epoxy resin which is obtained by glycidylating a polyhydric phenol; aliphatic ether type epoxy resins which are obtained by glycidylating polyhydric alcohols such as glycerin and polyethylene glycol; ether ester type epoxy resins which are obtained by glycidylating hydroxycarboxylic acids such as p-hydroxy benzoic acid and β-oxynaphthoic acid; ester type epoxy resins which are obtained by glycidylating polycarboxylic acids such as phthalic acid and terephthalic acid; glycidyl type epoxy resins such as glycidylated products of amine compounds such as 4,4-diaminodiphenylmethane and m-aminophenol, and an amine type epoxy resin such as triglycidylisocyanurate; an alicyclic epoxide such as 3,4-epoxycyclohexylmethyl-3',4'-epoxycyclohexanecarboxylate.

As the amine curing agent, an aromatic amine curing agent can also be suitably used as above described. Examples of the aromatic amine curing agent encompass aromatic polyamines such as orthophenylenediamine, methaphenylenediamine, paraphenylenediamine, diaminotoluene, N,N-dimethyl-para-phenylenediamine, N,N-diethyl-3,4-tolylenediamine, benzidine, tetramethyldiaminodiphenylmethane, tetraethyldiaminodiphenylmethane, diaminodiphenylamine, diaminostilbene, diaminodiphenylmethane, diaminodiphenyl sulfone, m-xylenediamine, and xylylenediamine.

The aromatic polyamines can be used alone or in combination of two or more of these. In a case where the aromatic polyamines are used in combination, ratios of the aromatic polyamines can be arbitrarily determined.

(2-2. Imidazole Compound)

The imidazole compound is preferably one or more compounds selected from the group consisting of imidazoles such as 2-methylimidazole, 2-ethyl-4-methylimidazole, 2-undecylimidazole, 2-heptadecylimidazole, 2-phenylimidazole, 1-aminoethyl-2-methylimidazole, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, and 1-(2-hydroxy-3-butoxypropyl)-2-ethyl-4-methylimidazole; and imidazolines such as 1-(2-hydroxy-3-phenoxypropyl)-2-phenylimidazoline, 1-(2-hydroxy-3-butoxypropyl)-2-methylimidazoline, 2-methylimidazoline, 2,4-dimethylimidazoline, 2-ethylimidazoline, 2-ethyl-4-methylimidazoline, 2-benzylimidazoline, 2-phenylimidazoline, 2-(ortho-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, and 1,4-phenylene-bis-4-methylimidazoline.

The imidazole compounds can be used alone or in combination of two or more of these. In a case where the imidazole compounds are used in combination, ratios of the imidazole compounds can be arbitrarily determined.

(2-3. Thiol Compound)

Examples of the thiol compound encompass 3-methoxybutyl(3-mercaptobutyrate), 2-methylhexyl(3-mercaptobutyrate), ethylene glycol bis(2-mercaptoisobutyrate), ethylene glycol bis(3-mercaptobutyrate), 1,2-propylene glycol(3-mercaptobutyrate), trimethylolpropane tris(3-mercaptobutyrate), tridecyl(3-mercaptobutyrate), 1,2-propylene glycol bis(2-mercaptoisobutyrate), 1,4-bis(3-mercaptobutyryloxy)butane, pentaerythritol tetrakis(3-mercaptobutyrate), 1,3,5-tris(3-mercaptobutyloxyethyl)-1,3,5-triazine-2,4,6(1H,3H,5H)-trione, 1,3,5-trimercaptomethylbenzene, bisphenol A bis(3-mercaptobutyrate), and triphenolmethane tris(3-mercaptobutyrate). Note, however, that the thiol compound used in the present invention is not limited to these.

The thiol compounds can be used alone or in combination of two or more of these. In a case where the thiol compounds are used in combination, ratios of the thiol compounds can be arbitrarily determined.

Among these, ethylene glycol bis(3-mercaptobutyrate), trimethylolpropane tris(3-mercaptobutyrate), 1,4-bis(3-mercaptobutyryloxy)butane, and/or pentaerythritol tetrakis(3-mercaptobutyrate) can be preferably used because these compounds can bring about a greater cure-accelerating effect even in a small amount thereof. These compounds can be used alone or in combination of two or more of these as a mixture.

The thiol compound used in the present invention can be easily obtained as a commercially available product. Examples of the thiol compound that can be obtained as a commercially available product encompass ethylene glycol bis(3-mercaptobutyrate) (product name: EGTP, manufactured by Yodo Kagaku Co., Ltd.), trimethylolpropane tris (3-mercaptobutyrate) (product name: TMTP, manufactured by Yodo Kagaku Co., Ltd.), 1,4-bis(3-mercaptobutyryloxy) butane (product name: BDTP, manufactured by Yodo Kagaku Co., Ltd.), pentaerythritol tetrakis(3-mercaptobutyrate) (product name: Karenz MT PE 1, manufactured by Showa Denko K.K.), and the like.

(2-4. Shell)

The shell of Embodiment 1 covers the core and includes at least a first shell. The first shell of Embodiment 1 preferably directly covers a surface of the core, has a urea group, and does not have an ester bond. It is more preferable that the first shell has a urea group, a buret group, and a urethane group and does not have an ester group.

In a case where a reaction product has a urea group, solvent resistance of an encapsulated curing agent tends increase. Further, in a case where the reaction product additionally has a buret group and a urethane group, the solvent resistance favorably tends to further increase.

On the other hand, in a case where the reaction product has an ester bond, the first shell is impaired due to hydrolysis reaction caused by the ester bond in a high humidity state, and this may reduce storage stability and humidity resistance of the encapsulated curing agent and physical properties of a cured product that is obtained by curing an epoxy resin composition (resin composition (A)) that contains the encapsulated curing agent.

The first shell is preferably an amine curing agent contained in the core; a reaction product of an epoxy resin curing agent (h1) (that is compatible with an amine curing agent) and an isocyanate compound; a reaction product of an amine curing agent and an isocyanate compound; a reaction product of an active hydrogen compound and an isocyanate compound; or the like. In view of good solvent resistance, it is particularly preferable that the first shell is a reaction product of an amine curing agent and an isocyanate compound.

Here, examples of the epoxy resin curing agent (h1) that is compatible with an amine curing agent encompass acid anhydride curing agents such as phthalic anhydride, hexahydrophthalic anhydride, tetrahydrophthalic anhydride, and methylnadic acid; phenol curing agents such as phenol novolac, cresol novolac, and bisphenol A novolac; mercaptan curing agent such as propylene glycol modified polymercaptan, thiogluconic acid ester of trimethylolpropane, and a polysulfide resin; a boron halide salt curing agent such as ethylamine salt of trifluoroborane; a quaternary ammonium salt curing agent such as phenol salt of 1,8-diazabicyclo(5,4,0)-undeca-7-en; a urea curing agent such as 3-phenyl-1,1-dimethylurea; phosphine curing agents such as triphenylphosphine and tetraphenylphosphoniumtetraphenyl borate; and the like. As the isocyanate compound, it is possible to suitably use any of the isocyanate compounds exemplified as a raw material of the amine adduct that is contained in the core.

The active hydrogen compound can be water; a compound having at least one primary amino group and/or secondary amino group; a compound which has at least one hydroxyl group and does not contain an ester group in its structure; or the like. These compounds can be used alone or in combination of two or more of these.

Examples of the compound having at least one primary amino group and/or secondary amino group encompass aliphatic amine, alicyclic amine, aromatic amine, and the like.

Examples of aliphatic amine encompass alkylamines such as methylamine, ethylamine, propylamine, butylamine, and dibutylamine; alkylenediamines such as ethylenediamine, propylenediamine, butylenediamine, and hexamethylenediamine; polyalkylenepolyamines such as diethylenetriamine, triethylenetetramine, and tetraethylenepentamine; polyoxyalkylenepolyamines such as polyoxypropylenediamine and polyoxyethylenediamine; and the like.

Examples of alicyclic amine encompass cyclopropylamine, cyclobutylamine, cyclopentylamine, cyclohexylamine, isophoronediamine, and the like.

Examples of aromatic amine encompass aniline, toluidine, benzylamine, naphthylamine, diaminodiphenylmethane, diaminodiphenyl sulfone, and the like.

Examples of the compound having at least one hydroxyl group encompass an alcohol compound, a phenol compound, and the like.

Examples of the alcohol compound encompass monoalcohols such as methylalcohol, propyl alcohol, butyl alcohol, amyl alcohol, hexylalcohol, heptyl alcohol, octyl alcohol, nonyl alcohol, decyl alcohol, undecyl alcohol, lauryl alcohol, dodecyl alcohol, stearyl alcohol, eicosyl alcohol, allyl alcohol, crotyl alcohol, propargyl alcohol, cyclopentanol, cyclohexanol, benzyl alcohol, cinnamyl alcohol, ethylene glycol monomethyl ether, ethylene glycol monoethyl ether, ethylene glycol monoethyl ether, and diethylene glycol monobutyl; and polyhydric alcohols such as ethylene glycol, polyethylene glycol, propylene glycol, polypropylene glycol, 1,3-butandiol, 1,4-butandiol, hydrogenated bisphenol A, neopentyl glycol, glycerin, trimethylolpropane, and pentaerythritol.

The polyhydric alcohols also encompass a compound which has, in one molecule, two or more secondary hydroxyl groups and is obtained by a reaction between (i) a compound having at least one epoxy group and (ii) one or more compounds selected from the group consisting of a compound having at least one hydroxyl group, a compound having at least one carboxyl group, a compound having at least one primary or secondary amino group, and a compound having at least one mercapto group. These alcohol compounds can be any of primary, secondary, and tertiary alcohols.

Examples of the phenol compound encompass monophenols such as carbolic acid, cresol, xylenol, carvacrol, thymol, and naphthol; and polyhydric phenols such as catechol, resorcin, hydroquinone, bisphenol A, bisphenol F, pyrogallol, and phloroglucine.

The compound having at least one hydroxyl group is preferably any of the polyhydric alcohols and the polyhydric phenols, particularly preferably any of the polyhydric alcohols.

The shell of Embodiment 1 preferably includes a second shell that is provided on a surface of the first shell and is made of a reaction product obtained from a reaction between the first shell and an epoxy resin (e2). The second shell is preferably a reaction product that is obtained from a reaction between the first shell and the epoxy resin (e2). The reaction product can be obtained by, for example, (i) a method in which particles serving as a starting material for forming a core are dispersed in a dispersion medium, and a material for forming a shell is added to the dispersion medium so as to precipitate the reaction product on the starting material particles or (ii) a method in which a raw material for forming a shell is added to a dispersion medium and a shell forming material is generated on surfaces of starting material particles which surfaces serve as a reaction field.

Examples of the dispersion medium encompass hydrocarbons such as benzene, toluene, xylene, cyclohexane, mineral spirit, and naphtha; ketones such as acetone, methyl ethyl ketone, and methyl isobutyl ketone; esters such as ethyl acetate, n-butyl acetate, and propylene glycol monomethyl ether acetate; alcohols such as methanol, isopropanol, n-butanol, butylcellosolve, and butyl Carbitol; a solvent such as water; phthalic acid diester plasticizers such as dibutyl phthalate and di(2-ethylhexyl)phthalate; an aliphatic dibasic acid ester plasticizer such as di(2-ethylhexyl) adipate; a triester phosphate plasticizer such as tricresyl phosphate; a glycol ester plasticizer such as polyethylene glycol ester: and the like.

As the epoxy resin (e2), it is possible to suitably use the polyvalent epoxy compounds exemplified as the epoxy resin (e1) which is a raw material of the amine adduct contained in the core. The epoxy resins (e2) can be used alone or in combination of two or more.

The epoxy resin (e2) is preferably (i) identical with an epoxy resin (e3) that is contained in a curing agent composition for a masterbatch type epoxy resin or (ii) a part of a mixture in a case where the epoxy resin (e3) is the mixture, because a microencapsulated epoxy resin curing agent having excellent storage stability and solvent resistance is more likely to be obtained.

As the epoxy resin (e3), it is possible to use the polyvalent epoxy compounds exemplified as the epoxy resin (e1) which is a raw material of the amine adduct contained in the core. Those epoxy resins can be used alone or in combination.

Among those, from the viewpoint of adhesiveness and resistance to high temperature of a cured product to be obtained, an epoxy resin obtained by glycidylating a polyhydric phenol is preferable, a bisphenol type epoxy resin is more preferable, a glycidylated product of bisphenol A and a glycidylated product of bisphenol F are further preferable.

(2-5. Method for Preparing Encapsulated Curing Agent, Etc.)

A method for covering the surface of the core with the first shell can be, for example, (i) a method in which a first shell is dissolved and solubility of the first shell is lowered in a dispersion medium, in which the core is dispersed, and thus the first shell is precipitated on the surface of the core, (ii) a method in which a shell-forming reaction is carried out in a dispersion medium in which the core is dispersed, and thus a shell is precipitated on the surface of the core, or (iii) a method in which a shell is generated on the surface of the core which surface serves as a reaction field.

The method for covering a surface of the first shell with the second shell can be, for example, a method in which the core covered with the first shell is caused to react with an epoxy resin at 20° C. to 80° C. for approximately 2 hours to 8 hours. Note that the encapsulated curing agent can be prepared as above described or a commercially available product can be used.

An average particle diameter of the encapsulated curing agent is preferably 1 μm or more and 100 μm or less, and more preferably 1 μm or more and 10 μm or less. In a case where the average particle diameter is smaller than 1 μm, the shell is cleaved when the resin composition (A) is mixed with another component, and accordingly a curing reaction may unfavorably start before being irradiated with laser light. In a case where the average particle diameter is larger than 100 μm, such a case is not preferable because (i) reactivity of the encapsulated curing agent may decrease and (ii) it may become difficult to mix a filler because the average particle diameter approaches a particle diameter of the filler and the encapsulated curing agent and the filler interfere with each other.

In a case where the average particle diameter is 1 μm or more and 10 μm or less, such a case is more preferable because (i) reactivity of the encapsulated curing agent increases and (ii) it becomes easy to mix a filler because the average particle diameter is smaller than a particle diameter of the filler and the encapsulated curing agent and the filler are less likely to interfere with each other.

Note that, in this specification, the term "average particle diameter" indicates a median diameter, and the term "particle diameter" indicates a Stokes' diameter measure by a light-scattering method with use of a particle size distribution meter (laser diffraction/scatter particle diameter distribution meter LA-750 manufactured by Horiba, Ltd.).

(3. Filler)

The filler is used to improve rigidity and heat stability of the resin composition (A). From this, in a case where the resin composition (A) is used for bonding, it is possible to achieve firm bonding with high resistance to high temperature.

As the filler, it is possible to suitably use calcium carbonate, silica (which can be either fused silica or crystalline silica), mica, talc, glass beads, alumina, silicon nitride, calcium silicate, barium sulfate, aluminium hydroxide, magnesium hydroxide, or the like. These inorganic fillers can be used alone or in combination of two or more of these. In a case where the inorganic fillers are used in combination, ratios of the inorganic fillers can be arbitrarily determined.

Among these, the filler is preferably one or more fillers selected from the group consisting of calcium carbonate, silica, mica, talc, and glass beads because these can bring about good rigidity and heat stability.

Further, the filler is preferably one or more fillers selected from the group consisting of fused silica, crystalline silica, and glass beads because these are excellent in effect of improving rigidity of the resin composition (A) and in light-transmitting property.

The filler which is excellent in light-transmitting property is advantageous in a case where the resin composition (A) is used as an adhesive agent and the resin composition (A) is sandwiched between a surface of one adherend and a surface of another adherend that is different from the one adherend, that is, in a case where the resin composition (A) is sandwiched between surfaces of respective different adherends in order to bond the different adherends together.

That is, in such a case, the resin composition (A) is to be irradiated with laser light that has passed through the adherend, and thus the resin composition (A) is indirectly irradiated with the laser light. In this case, the filler having an excellent light-transmitting property can greatly inhibit reflection of light as compared with a normal white filler, and it is therefore possible to more efficiently proceed with a curing reaction.

(4. Color Material)

The color material is contained in the resin composition (A) so that the resin composition (A) can efficiently absorb heat of laser light and a curing reaction proceeds more efficiently. The color material is preferably one or more selected from the group consisting of an inorganic pigment, an organic pigment, and a dye.

Concrete examples of the inorganic pigment which can be suitably used encompass mars black, ivory black, peach black, lampblack, carbon black, titanium dioxide, white lead, lithopone, red lead, cobalt violet, light red, cobalt blue, cerulean blue, ultramarine blue, Prussian blue, cobalt green, chromium oxide green, chrome yellow, zinc yellow, iron oxide compounds (such as iron red, yellow iron oxide, black iron oxide), chrome oxide compounds (such as chrome oxide (III), chrome oxide (IV), viridian), copper compounds (such as verdigris, mountain green), and the like.

The inorganic pigments can be used alone or in combination of two or more of these. In a case where the inorganic pigments are used in combination of two or more, ratios of the inorganic pigments can be arbitrarily determined. Among these, the inorganic pigment is more preferably a black-based pigment, a red-based pigment, a blue-based pigment, a green-based pigment, and a yellow-based pigment, because of their excellent heat-absorbing property.

Concrete examples of the organic pigment which can be suitably used encompass lake red c, permanent red 2b, naphthol red, perylene, perinone, indigoid, Cromophtal red, quinacridone, anthraquinone, diketopyrrolopyrrole, alizarin lake, isoindolinone, isoindolin, azomethine, anthraquino, anthrone, xanthene, first yellow, disazo yellow, Cromophtal yellow, nickel azo yellow, benzimidazolone yellow, quinoline yellow lake, rhodamine lake, brilliant carmine 6b, phthalocyanine compounds (such as phthalocyanine, phthalocyanine green, phthalocyanine blue), dioxazine, and the like.

The organic pigments can be used alone or in combination of two or more of these. In a case where the organic pigments are used in combination of two or more, ratios of the organic pigments can be arbitrarily determined. Among these, the organic pigment is more preferably a black-based pigment, a red-based pigment, a blue-based pigment, a green-based pigment, and a yellow-based pigment, because of their excellent heat-absorbing property.

Concrete examples of the dye which can be suitably used encompass a direct dye, an acid dye, a basic dye, a disperse dye, a reactive dye, a mordant dye, an acid mordant dye, and the like.

The dyes can be used alone or in combination of two or more of these. In a case where the dyes are used in combination of two or more, ratios of the dyes can be arbitrarily determined. Among these, the dye is more preferably a black-based dye, a red-based dye, a blue-based dye, a green-based dye, and a yellow-based dye, because of their excellent heat-absorbing property.

The color material is preferably one or more color materials selected from the group consisting of carbon black, and a pigment and a dye which are different from carbon black. Carbon black is preferable because carbon black contained in the resin composition (A) allows a heat-absorbing property of the resin composition (A) to be greatly improved, and carbon black is inexpensive and is high in versatility.

Meanwhile, carbon black is more likely to absorb heat of the surface of the resin composition (A). Therefore, carbon black is particularly suitably used in a case where a film which has been obtained by applying the resin composition (A) and has a relatively small film thickness is to be quickly cured. The film thickness is preferably less than 300 µm, more preferably 100 µm or less, and particularly preferably 50 µm or less. A lower limit of the film thickness is not particularly limited, provided that the film has an effective thickness to be applied with the resin composition (A), and only needs to be larger than 0 µm.

The film thickness can be adjusted, for example, with use of a conventionally known thickness gauge as later described in Examples.

As such, in a case where the film thickness is less than 300 µm, carbon black can be particularly suitably used. Note that, even in a case where the film thickness is less than 300 µm, it is possible to employ a pigment and/or a dye different from carbon black. Alternatively, in a case where the film thickness is less than 300 µm, it is possible to use one or more color materials selected from the group consisting of carbon black, and a pigment and a dye which are different from carbon black. That is, a pigment and/or a dye which are not carbon black can be used in combination with carbon black.

Note that the pigment other than carbon black can be a pigment which is included in the above described inorganic pigments except carbon black and can be the organic pigment.

In a case where the film thickness is 300 µm or more and only carbon black is used as the color material, laser light may not sufficiently reach a deep part of the film. However, even in such a case, it is possible to cause laser light to reach the deep part of the film by employing, instead of carbon black, a pigment and/or a dye which are not carbon black or by using such a pigment and/or a dye in combination with carbon black. In this case, the film thickness is preferably 300 µm or more and 5 mm or less.

In a case where the film thickness is 300 µm or more and 5 mm or less, it is particularly preferable to employ, instead of carbon black, a pigment and/or a dye which are not carbon black as the color material, in order for laser light to sufficiently reach the deep part of the film.

(5. Contained Amounts of Components, Method for Preparing Resin Composition (A))

An amount of the epoxy resin contained in the resin composition (A) can be changed as appropriate in accordance with a purpose of use. By taking into consideration resistance to high temperature of a cured product, a contained amount of the epoxy resin is preferably in a range between not less than 10% by weight and not more than 99% by weight, more preferably in a range between not less than 20% by weight and not more than 95% by weight, and particularly preferably in a range between not less than 30% by weight and not more than 90% by weight, relative to 100% by weight of the resin composition (A).

In order to sufficiently proceed with a curing reaction, an amount of the encapsulated curing agent contained in the resin composition (A) is preferably not less than 0.1 parts by weight and not more than 70 parts by weight, more preferably not less than 1 part by weight and not more than 60 parts by weight, and particularly preferably not less than 3 parts by weight and not more than 50 parts by weight, relative to 100 parts by weight of the epoxy resin.

An amount of the filler contained in the resin composition (A) is preferably not less than 5 parts by weight and not more than 80 parts by weight, more preferably not less than 10 parts by weight and not more than 70 parts by weight, particularly preferably not less than 20 parts by weight and not more than 60 parts by weight, relative to 100 parts by weight of the epoxy resin.

In a case where a contained amount of the filler is less than 5 parts by weight, strength of the resin composition (A) becomes unfavorably insufficient. In a case where the contained amount of the filler is more than 80 parts by weight, viscosity of the resin composition (A) becomes excessively high, and this unfavorably makes it difficult to cause a curing reaction.

In order to cause the resin composition (A) to efficiently absorb laser light, an amount of the color material contained in the resin composition (A) is preferably not less than 0.01 parts by weight and not more than 20 parts by weight, relative to 100 parts by weight of the epoxy resin contained in the resin composition (A).

In a case where the color material is carbon black, a contained amount of the carbon black is preferably not less than 0.01 parts by weight and not more than 20 parts by weight, more preferably not less than 0.5 parts by weight and not more than 10 parts by weight, particularly preferably not less than 1 part by weight and not more than 7 parts by weight, relative to 100 parts by weight of the epoxy resin.

The carbon black is particularly advantageous in a case where a heat-absorbing property of the resin composition whose film thickness is relatively small is improved and curing of the resin composition is facilitated. Therefore, it is particularly preferable to use carbon black in a case where a film thickness of a film obtained by applying the resin composition is less than 300 µm. Moreover, in a case where the film thickness is less than 300 µm, it is most preferable to use carbon black alone as the color material.

A contained amount of the pigment and/or dye different from carbon black in the resin composition (A) is preferably not less than 0.01 parts by weight and not more than 30 parts by weight, and particularly preferably not less than 0.5 parts by weight and not more than 20 parts by weight, relative to 100 parts by weight of the epoxy resin contained in the resin composition (A).

The pigment and/or dye different from carbon black is particularly advantageous in a case of causing laser light to sufficiently reach a deep part of the resin composition (A) which has a relatively large film thickness. Therefore, the pigment and/or dye different from carbon black is particularly preferably used in a case where a film thickness of a film obtained by applying the resin composition (A) is 300 μm or more and 5 mm or less.

Note that, in a case where one or more color materials selected from the group consisting of carbon black and the pigment and dye different from carbon black are used in combination, ratios of the color materials cannot be determined automatically, and can be adjusted so that intended curing can be carried out.

The resin composition (A) can contain the epoxy resin, the encapsulated curing agent, the filler, and the color material so that a ratio of these becomes 100% by weight. Alternatively, the resin composition (A) can further contain other components such as a flame retardant and a curing assistant agent. Contained amounts of the other components will be described later.

A method for preparing the resin composition (A) is not limited to a particular one. For example, the resin composition (A) can be prepared by a method in which the epoxy resin, the encapsulated curing agent, the filler, and the color material and, according to need, other components are put in a container and mixed, and are subsequently stirred with use of a commercially available planetary centrifugal mixer.

(6. Flame Retardant)

The resin composition (A) can contain one or more flame retardants selected from the group consisting of a bromine flame retardant, a phosphorus flame retardant, a nitrogen flame retardant, a chlorine flame retardant, an antimony compound flame retardant, an aluminium hydroxide flame retardant, and a magnesium hydroxide flame retardant. In a case where the flame retardants are used in combination, ratios of the flame retardants can be arbitrarily determined.

In a case where the flame retardant is contained in the resin composition (A), it is possible to inhibit excessive heat from being generated from the surface of the resin composition (A), and this makes it possible to inhibit splash-out during a curing reaction.

Examples of the bromine flame retardant encompass tetrabromobisphenol A, tetrabromobenzene, hexabromobenzene, tribromophenol, and hexabromocyclodecane.

Examples of the phosphorus flame retardant encompass red phosphorus, triphenyl phosphate, tricresyl phosphate, trixylenyl phosphate, cresyl diphenyl phosphate, 2-ethylhexyldiphenyl phosphate, t-butylphenyldiphenyl phosphate, bis-(t-butylphenyl)phenyl phosphate, tris-(t-butylphenyl) phosphate, isopropylphenyldiphenyl phosphate, bis-(isopropylphenyl)diphenyl phosphate, tris-(isopropylphenyl) phosphate, resorcinol bis-diphenyl phosphate, resorcinol bis-dixylenyl phosphate, and bisphenol A bis-diphenyl phosphate.

Examples of the nitrogen flame retardant encompass melaminecyanurate, guanidine sulfamate, guanidine phosphate, guanylurea phosphate, and melamine phosphate.

Examples of the chlorine flame retardant encompass chlorinated paraffin and perchloropentacyclodecane.

Examples of the antimony compound flame retardant encompass antimony trioxide, antimony pentoxide, and trisodium antimonate.

An example of the aluminium hydroxide flame retardant encompasses aluminium hydroxide.

An example of the magnesium hydroxide flame retardant encompasses magnesium hydroxide.

It is preferable that the flame retardant is contained, in 100 parts by weight of the resin composition (A), in an amount of not less than 1 part by weight and not more than 50 parts by weight.

(7. Curing Assistant Agent)

The resin composition (A) can contain one or more curing assistant agents selected from the group consisting of an amine compound, an imidazole compound, a thiol compound, an acid anhydride compound, and a thermal acid generating agent. In a case where the curing assistant agents are used in combination, ratios of the curing assistant agents can be arbitrarily determined.

The curing assistant agent contained in the resin composition (A) makes it possible to further facilitate a curing reaction. Note that, in this specification, the curing assistant agent means a compound that is used in combination with the encapsulated curing agent and facilitates a curing reaction caused by the encapsulated curing agent.

An amount of the curing assistant agent contained in the resin composition (A) is preferably not less than 1 part by weight and not more than 60 parts by weight, relative to 100 parts by weight of the resin composition (A).

(7-1. Amine Compound)

It is preferable that the amine compound serving as the curing assistant agent is stable in a mixed system with an epoxy resin at around a room temperature and serves, by being subjected to heat treatment at 80° C. or higher and 120° C. or lower, as a curing agent by which a cured product having a high heat distortion temperature can be obtained.

From these viewpoints, the amine compound is preferably a denatured aliphatic polyamine compound. The denatured aliphatic polyamine compound is preferably a compound which (i) is a solid that is insoluble in a general liquid epoxy resin at around a room temperature but (ii) becomes soluble by being heated so as to perform its intrinsic function.

The denatured aliphatic polyamine compound only needs to be a reaction product obtained by reacting at least an amine compound with an isocyanate compound. In general, a compound called a denatured product of aliphatic polyamine is encompassed in the denatured aliphatic polyamine compound.

Specifically, examples of the denatured aliphatic polyamine compound encompass a reaction product that is obtained by a reaction of (i) a dialkylaminoalkylamine compound, (ii) a cyclic amine compound which has one or more nitrogen atoms bonded with active hydrogen in a molecule, and (iii) a diisocyanate compound.

Alternatively, the denatured aliphatic polyamine compound can be a reaction product obtained by reacting, as a fourth component, (iv) an epoxy compound with the above three components (i), (ii), and (iii).

Among the denatured aliphatic polyamine compounds, it is possible to suitably use a reaction product which is obtained by a thermal reaction of three components, i.e., the above (i), a cyclic amine compound which has one or two nitrogen atoms bonded with active hydrogen in a molecule among the above (ii), and the above (iii); or a reaction product which is obtained by a thermal reaction of four components, i.e., the above (i), a cyclic amine compound which has one or two nitrogen atoms bonded with active hydrogen in a molecule among the above (ii), the above (iii), and an epoxy compound having more than one epoxy group in a molecule on average among the above (iv).

Further, the denatured aliphatic polyamine compound can be compounds disclosed in Japanese Examined Patent Application Publication Tokukosho No. 58-55970 (1983), Japanese Patent Application Publication Tokukaisho No. 59-27914 (1984), Japanese Patent Application Publication Tokukaisho No. 59-59720 (1984), Japanese Patent Application Publication Tokukaihei No. 3-296525 (1991), and the like.

Here, the above (i) dialkylaminoalkylamine compound is not limited to a particular one, and it is possible to suitably use, for example, a compound having a structure represented by Formula (1) below.

[Chem. 1]

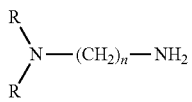

(1)

where R independently represents a straight-chain or branched-chain C1-C4 alkyl group, and n represents 2 or 3.

Concrete examples of the (i) dialkylaminoalkylamine compound encompass dimethylaminopropylamine, diethylaminopropylamine, dipropylaminopropylamine, dibutylaminopropylamine, dimethylaminoethylamine, diethylaminoethylamine, dibutylaminoethylamine, and the like. Among these, the (i) dialkylaminoalkylamine compound is particularly preferably dimethylaminepropylamine or diethylaminopropylamine. The (i) dialkylaminoalkylamine compounds can be used alone or in combination of two or more. In a case where the (i) dialkylaminoalkylamine compounds are used in combination, ratios of the (i) dialkylaminoalkylamine compounds can be arbitrarily determined.

The (ii) cyclic amine compound which has one or more nitrogen atoms bonded with active hydrogen in a molecule is not limited to a particular one. Specifically, examples of the above (ii) encompass polyamines and monoamines such as metaxylylenediamine, 1,3-bis(aminomethyl)cyclohexane, isophoronediamine, diaminecyclohexane, phenylenediamine, toluylenediamine, diaminodiphenylmethane, diaminodiphenyl sulfone, piperazine, N-aminoethylpiperazine, benzylamine, and cyclohexylamine.

Among these, the cyclic amine compound is particularly preferably metaxylylenediamine, 1,3-bis(aminomethyl)cyclohexane, isophoronediamine, N-aminoethylpiperazine, cyclohexylamine, or benzylamine.

Among these amine components, polyamines have, as a curing agent compound, a function as a molecular chain growth material, and monoamines have a function as a molecular weight adjusting material. The (ii) cyclic amine compounds which have one or more nitrogen atoms bonded with active hydrogen in a molecule can be used alone or in combination of two or more. In a case where the (ii) cyclic amine compounds are used in combination, ratios of the (ii) cyclic amine compounds can be arbitrarily determined.

The (iii) diisocyanate is not limited to a particular one. Specifically, examples of the (iii) diisocyanate encompass isophoronediisocyanate, metaxylylenediisocyanate, 1,3-bis(isocyanatemethyl)cyclohexane, 2,4-toluylenediisocyanate, 2,6-toluylenediisocyanate, 1,5-naphthylenediisocyanate, 1,4-phenylenediisocyanate, diphenylmethane-4,4'-diisocyanate, 2,2'-dimethyldiphenylmethane-4,4'-diisocyanate, hexamethylenediisocyanate, trimethylhexamethylenediisocyanate, and the like.

Among these, the (iii) diisocyanate is particularly preferably diisocyanate having a cyclic structure. The (iii) diisocyanates can be used alone or in combination of two or more. In a case where the (iii) diisocyanates are used in combination, ratios of the (iii) diisocyanates can be arbitrarily determined.

The (iv) epoxy compound is not limited to a particular one. Specifically, examples of the (iv) epoxy compound encompass glycidyl ethers obtained by reacting epichlorohydrin with polyhydric phenol such as bisphenol A, bisphenol F, bisphenol S, hexahydrobisphenol A, tetramethylbisphenol A, catechol, resorcin, cresol novolac, tetrabromobisphenol A, trihydroxybiphenyl, bisresorcinol, bisphenolhexafluoroacetone, hydroquinone, tetramethylbisphenol A, tetramethylbisphenol F, triphenylmethane, tetraphenylethane, and bixylenol; polyglycidyl ethers obtained by reacting epichlorohydrin and aliphatic polyhydric alcohol such as glycerin, neopentyl glycol, ethylene glycol, propylene glycol, butylene glycol, hexylene glycol, polyethylene glycol, and polypropylene glycol; glycidyl ether esters obtained by reacting epichlorohydrin with hydroxycarboxylic acid such as p-hydroxy benzoic acid and β-oxynaphthoic acid; polyglycidyl esters obtained from polycarboxylic acids such as phthalic acid, methylphthalic acid, isophthalic acid, terephthalic acid, tetrahydrophthalic acid, hexahydrophthalic acid, endo methylenehexahydrophthalic acid, trimellitic acid, and polymerized aliphatic acid; glycidylaminoglycidyl ethers obtained from aminophenol, aminoalkylphenol, and the like; glycidylaminoglycidyl ester obtained from aminobenzoic acid; glycidylamines obtained from aniline, toluidine, tribromaniline, xylylenediamine, diaminocyclohexane, bisaminomethylcyclohexane, 4,4'-diaminodiphenylmethane, 4,4'-diaminodiphenyl sulfone, and the like; epoxidized polyolefin; glycidylhydantoin; glycidylalkylhydantoin; triglycidyl cyanurate; and monoepoxides such as butyl glycidyl ether, phenyl glycidyl ether, alkylphenyl glycidyl ether, benzoic acid glycidyl ester, and styrene oxide.

The (iv) epoxy compounds can be used alone or in combination of two or more. In a case where the (iv) epoxy compounds are used in combination, ratios of the (iv) epoxy compounds can be arbitrarily determined.

It is more preferable that the (iv) epoxy compound is a combination of polyepoxide having a plurality of epoxy groups in a molecule and monoepoxide having one (1) epoxy group in a molecule.

As the polyepoxide, it is particularly preferable to use, for example, diepoxide such as bisphenol A type diepoxide whose epoxy equivalent is approximately 190, bisphenol F type diepoxide whose epoxy equivalent is approximately 175, diglycidyl aniline, or diglycidylorthotoluidine.

As the monoepoxide, it is particularly preferable to use phenyl glycidyl ether, methylphenyl glycidyl ether, butylphenyl glycidyl ether, or the like.

Among these epoxides, polyepoxide, particularly diepoxide has a function as a molecular chain growth material, and monoepoxide has a function as a molecular weight adjusting material.

As the denatured aliphatic polyamine compound, it is possible to suitably use a commercially available general denatured aliphatic polyamine compound. Such a commercially available product is not limited to a particular one and can be, for example, FUJICURE (Registered Trademark) FXE-1000, FXR-1030, FXB-1050 (manufactured by Fuji Kasei Co., Ltd.), or the like.

(7-2. Imidazole Compound)

The imidazole compound serving as a curing assistant agent is preferably an epoxy resin imidazole adduct compound. The epoxy resin imidazole adduct compound is basically a reaction product (in general, which is called "epoxy compound imidazole adduct") obtained by a reaction of an epoxy compound and an imidazole compound. Specifically, the epoxy resin imidazole adduct compound (i.e., epoxy compound imidazole adduct) is a reaction product obtained from an imidazole compound which (i) has, in a molecule, one or more active hydrogens that can cause addition reaction with epoxy groups of monofunctional and polyfunctional epoxy compounds and (ii) has one or more imidazole groups in at least one molecule.

The imidazole compound is preferably one or more compounds selected from the group consisting of 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecylimidazoliumtrimellitate, 1-cyanoethyl-2-phenylimidazoliumtrimellitate, 2,4-diamino-6-[2'-methylimidazolyl-(1)]-ethyl-s-triazine, 2-phenylimidazole isocyanuric acid addition product, 2-methylimidazole, 2-undecylimidazole, 2-ethyl-4-methylimidazole, 2-phenyl-4-methylimidazole, 1-benzyl-2-methylimidazole, 1-benzyl-2-phenylimidazole, and 1,2-dimethylimidazole.

As the epoxy compound, it is possible to use bisphenol A diglycidyl ether, bisphenol F diglycidyl ether, or the like.

Such a reaction product obtained by reaction of an epoxy compound with an imidazole compound encompasses reaction products obtained by a reaction of an imidazole compound with any of aliphatic, alicyclic, aromatic, and heterocyclic epoxy compounds. Therefore, a chemical structure of the epoxy compound imidazole adduct is not definitely determined and can be exemplified by those disclosed in Japanese Patent Application Publication Tokukaisho No. 62-285913 (1987), Japanese Patent Application Publication Tokukaihei No. 3-139517 (1991), Japanese Patent Application Publication Tokukaihei No. 6-49176 (1994), Japanese Patent Application Publication Tokukaihei No. 6-211969 (1994), Japanese Patent Application Publication Tokukaihei No. 7-196776 (1995), and the like.

A commercially available product of the epoxy resin imidazole adduct compound is not limited to a particular one, and it is possible to use AJICURE (Registered Trademark) PN-23, PN-R (which are manufactured by Ajinomoto Fine-Techno Co., Inc.), or the like. The epoxy resin imidazole adduct compounds can be used alone or in combination of two or more. In a case where the epoxy resin imidazole adduct compounds are used in combination, ratios of the epoxy resin imidazole adduct compounds can be arbitrarily determined.

(7-3. Thiol Compound)

As the thiol compound serving as a curing assistant agent, it is possible to suitably use any of the above exemplified thiol compounds which can be contained in the above described encapsulated curing agent.

(7-4. Acid Anhydride Compound)

Examples of the acid anhydride curing agent encompass phthalic anhydride, trimellitic anhydride, pyromellitic anhydride, hexahydrophthalic anhydride, tetrahydrophthalic anhydride, 3-chlorophthalic anhydride, 4-chlorophthalic anhydride, benzophenonetetracarboxylic anhydride, succinic anhydride, methylsuccinic anhydride, dimethylsuccinic anhydride, dichlorosuccinic anhydride, methylnadic acid, dodecylsuccinic acid, maleic anhydride, and the like. These compounds can be used alone or in combination of two or more. In a case where the compounds are used in combination, ratios of the compounds can be arbitrarily determined.

(7-5. Thermal Acid Generating Agent)

Examples of the thermal acid generating agent encompass triarylsulfonium salt, monosulfonium salt, bissulfonium salt, iodonium salt, a phenacyl compound, and the like.

(8. Irradiation with Laser Light)

The method for curing a resin composition in accordance with the present invention includes the step (a) of directly and/or indirectly irradiating the resin composition (A) with laser light.

From the viewpoint of carrying out sufficient curing in a short time, the laser light has a wavelength whose lower limit is preferably 600 nm or more, 800 nm or more, 900 nm or more, and particularly preferably 800 nm or more or 900 nm or more. Moreover, from a similar viewpoint, an upper limit of the wavelength is preferably 1500 nm or less, and more preferably 1000 nm or less.

A type of a laser is not limited to a particular one, provided that the laser light having the above wavelength can be emitted. For example, the type of the laser can be an He—Ne laser, a semiconductor laser, a $CO_2$ laser, an Nd:YAG laser, or the like.

In the method in accordance with the present invention, the resin composition (A) containing the encapsulated curing agent is irradiated with laser light, and this makes it possible to sufficiently cure the resin composition (A) in a very short time, i.e., in several seconds. An irradiation time with laser light is preferably 5 seconds or more, preferably 7 seconds or more, and more preferably 10 seconds or more.

In Examples described later, it was confirmed that an inside of the resin composition (A) was sufficiently cured by irradiation with laser light for 10 seconds or 7 seconds. Note, however, that the irradiation time is not limited to 7 seconds or 10 seconds.

In the method in accordance with the present invention, the resin composition (A) can be sufficiently cured in an irradiation time of several seconds, and therefore a long irradiation time is not necessary. Further, irradiation for an excessively long time may heat up peripheral components and this may lead to shape deformation, and therefore an upper limit of the irradiation time is preferably 20 seconds or less, more preferably 15 seconds or less, and particularly preferably 10 seconds or less.

The description "directly irradiating the resin composition (A) with laser light" means that the resin composition (A) is irradiated with laser light via no other members. Meanwhile, the description "indirectly irradiating the resin composition (A) with laser light" means that, for example, the resin composition (A) is irradiated with laser light which has passed through another member.

For example, in a case where the resin composition (A) is applied to any of or both of two surfaces of respective adherends which are to be bonded together and consequently the resin composition (A) is sandwiched between the two surfaces, the resin composition (A) is to be irradiated with laser light which has passed through the adherend. In this case, the resin composition (A) is indirectly irradiated with laser light.

Meanwhile, the case where the resin composition (A) is directly irradiated with laser light can be a case where, for example, the resin composition (A) which has been applied to a surface of a certain member is directly irradiated with laser light.

In this case, although bonding of members is not intended, the present invention has found for the first time that a firm cured product can be obtained in an extremely short time by irradiating the resin composition (A) with laser light, without placing an excessive heat load on a part that is around a part to which the resin composition (A) has been applied. This finding can be considered as significantly useful. Therefore, an aspect in which the resin composition (A) is directly irradiated with laser light also falls within the scope of the present invention.

The method in accordance with the present invention includes the step (a) of directly and/or indirectly irradiating the resin composition (A) which contains an encapsulated curing agent with laser light. With the configuration, heat is not applied to the entire members but heat energy of laser light is locally applied only to the part to which the resin composition (A) has been applied, unlike curing which is carried out with use of a conventional heat curing oven. This makes it possible to significantly reduce a heat load placed on the entire members.

The shell of the encapsulated curing agent is cleaved by the heat energy, and the curing agent contained in the core cures the epoxy resin contained in the resin composition (A). Conventionally, an encapsulated curing agent has been used in order to gradually proceed with a curing reaction by gradually melting a shell with heat.

On the other hand, in the present invention, the encapsulated curing agent is irradiated with laser light at a timing at which a curing reaction is intended to occur. From this, the shell is cleaved at one stroke, and thus a curing reaction is quickly carried out. As a result, it has been found that an epoxy resin can be cured in a very short time and a cured product having high durability can be obtained, unlike a conventional method in which a one-part epoxy resin composition is cured with heat.

The encapsulated curing agent stably exists in the resin composition (A) in a normal state, and therefore the resin composition (A) is long in work life and is excellent in workability. Moreover, the encapsulated curing agent includes the core which contains a curing agent inside the shell, and thus the curing agent is in an encapsulated state. Energy of laser light is concentrated on the shell, and it is therefore possible to quickly cure the epoxy resin that exists in the vicinity of the encapsulated curing agent after the shell is cleaved. The epoxy resin generates heat when being cured, and the heat propagates in the resin composition (A). As a result, curing of the whole epoxy resin contained in the resin composition (A) is also finished in a very short time.

On the other hand, a general one-part epoxy resin composition which is mixed with an epoxy resin is to be dispersed in the epoxy resin, and therefore energy of laser light is not necessarily concentrated on the one-part epoxy resin composition. Therefore, as indicated in Comparative Example described later, sufficient curing does not seem to be carried out even by irradiating, with laser light, a conventional one-part epoxy resin composition which does not contain an encapsulated curing agent.

In the encapsulated curing agent, the core and the shell are in a form of liquid, and a pseudo interface is formed between the core and the shell. The interface easily disappears when the encapsulated curing agent is irradiated with laser light, and it is therefore possible to quickly cure the epoxy resin.

On the other hand, a general one-part epoxy resin composition is in a form of powder, and therefore a curing reaction starts after a solid is changed into a liquid. That is, in addition to energy necessary for the curing reaction, energy for changing the solid into the liquid is required. This also seems to be a reason that sufficient curing cannot be carried out even by irradiating the general one-part epoxy resin composition with laser light.

As such, in the method in accordance with the present invention, it is possible to concentratively apply energy of laser light to the curing agent contained in the encapsulated curing agent. From this, for example, in a case where the resin composition (A) is applied to a plurality of parts in an electronic component, it is possible to bond the plurality of parts by irradiating each of the parts with laser light, without applying heat to the whole electronic component.

It is possible to carry out curing in a plurality of parts at one time by simultaneously irradiating the plurality of parts with respective of a plurality of rays of branched laser light. The branching can be easily carried out by, for example, using a laser light irradiation device which can branch laser light with use of optical fibers.

Further, it is possible to sequentially carry out curing under different conditions by using a plurality of laser light irradiation devices and setting different irradiation conditions to the respective plurality of laser light irradiation devices.

Embodiment 2

A resin composition curing method in accordance with Embodiment 2 includes a step (b) of directly or indirectly applying energy to the resin composition (A) after the step (a), the energy being different from that of the laser light.

As described in Embodiment 1, the resin composition curing method in accordance with the present invention can sufficiently bring about the effect of the present invention only by the step (a). Here, for example, even in a case where an area of a part to which the resin composition (A) is applied is large (e.g., an area of approximately 5 cm×5 cm), the effect can be brought about by scanning the whole area with laser light.

Meanwhile, the laser light is to be locally applied. From this, in a case where a large area needs to be irradiated and a curing reaction by the laser light irradiation is assisted by directly or indirectly applying energy different from that of the laser light (i.e., heat energy of laser light) to the resin composition (A), it is possible to more efficiently carry out the curing reaction. Moreover, the application of other energy is effective not only in the case where a large area needs to be irradiated with laser light but also in a case where more complete curing is intended to be carried out. In view of the above, the embodiment including the step (b) also falls within the present invention.

Examples of the energy different from that of laser light encompass heat rays such as an ultraviolet ray, an electron beam, an infrared ray, an X-ray, a sun beam, emanation, and radiation; and energy obtained from energy sources such as a heater and a curing oven.

In a case where the resin composition (A) is subjected to the step (b) after the step (a), the application of other energy is assistive because curing by the step (a) is already proceeding. Therefore, a time for a process by the other energy can be set to greatly shorter than a time required for a case where only the other energy is applied to the resin composition (A) (e.g., in a normal heat treatment in which only a curing oven is used). From this, even in a case where the step (b) is additionally carried out, an adverse effect such as deformation of a member caused by an excessive heat load hardly occurs.

With regard to the meaning of the description "directly or indirectly", the description in Embodiment 1 applies. A time for applying the other energy is preferably 30 seconds or more and 5 minutes or less, because the application of other energy is carried out in order to facilitate a subsidiary curing reaction.

Embodiment 3

In a resin composition curing method in accordance with Embodiment 3, the resin composition (A) is sandwiched between a surface of at least one adherend and a surface of another adherend which is different from the at least one adherend. The method includes a step (a) of directly and/or indirectly irradiating the resin composition (A) with laser light. As a result, the resin composition (A) is cured, and thus the at least one adherend and the another adherend are bonded together. In this specification, the term "adherend" indicates a subject to be bonded.

The description "the resin composition (A) is sandwiched between a surface of at least one adherend and a surface of another adherend which is different from the at least one adherend" means that the resin composition (A) exists between the surface of the at least one adherend and the surface of the another adherend different from the at least one adherend.

Examples of such a case encompass a case where the resin composition (A) is applied to a surface of at least one adherend, and a surface of another adherend which is different from the at least one adherend is attached to the surface on which the resin composition (A) has been applied, so that the resin composition (A) exists between the surfaces.

A method for carrying out the bonding is not limited to a particular one, and can be carried out by (i) stacking the surface of the another adherend onto the resin composition (A) which has been applied to the surface of the at least one adherend and (ii) applying appropriate pressure thereto.

FIG. 1 is a view schematically illustrating a state in which (i) a resin composition (A) 1 is applied to a surface of an adherend 2, (ii) a surface of another adherend 3 is attached onto the resin composition (A) 1, and (iii) an upper surface of the another adherend 3 is irradiated with laser light. The arrows in FIG. 1 indicate the laser light.

The laser light passes through the adherend 3 and then reaches the resin composition (A) 1. Thus, a curing reaction is ended in a short time, and the adherend 2 and the another adherend 3 are firmly bonded together.

In FIG. 1, the laser light is emitted toward the upper surface of the another adherend 3. Note, however, that an aspect of the laser light irradiation is not limited to this. For example, laser light can be emitted from a lower surface side of the adherend 2 in FIG. 1, or can be emitted from both the upper surface side and the lower surface side, or can be emitted toward one or more four lateral surfaces of the resin composition (A) 1 in FIG. 1.

With regard to the "surface of the at least one adherend", the "surface" can be one surface or can be two or more surfaces. For example, in a case where the at least one adherend is a plate member, the surface can be a front surface and/or a rear surface of each of the at least one adherend.

That is, it is possible that (i) the resin composition (A) is applied only to a front surface or a rear surface of the plate member and a surface of the another adherend is attached to the front surface or the rear surface or (ii) the resin composition (A) is applied to the front surface and the rear surface of the plate member and surfaces of other adherends are attached to respective of the front surface and the rear surface.

Of course, the adherend is not limited to the plate member, provided that the adherend has a surface.

In each of one or more surfaces of the at least one adherend, the resin composition (A) can be applied in one part or can be applied in a plurality of parts.

The resin composition (A) can be applied to the "another adherend". Alternatively, in a case where the resin composition (A) is applied to the "at least one adherend" to which the another adherend is to be attached, the resin composition (A) does not need to be applied to the "another adherend".

The number of the "another adherend" which is to be attached to one surface of the "at least one adherend" can be one or can be two or more.

A material of the adherend is not limited to a particular one. Moreover, materials of the "at least one adherend" and the "another adherend" can be identical materials or can be different materials. As the material, for example, a general resin can be used. Examples of the resin encompass super engineering plastics such as polysulfone, polyethersulfone, polyallylate, polyamideimide, polyetherimide, liquid crystal polymer, polytetrafluoroethylene, polychlorotrifluoroethylene, and polyvinylidene fluoride; engineering plastics such as 6-nylon, 66-nylon, polyacetal, polycarbonate, polyethylene terephthalate, modified polyphenyleneether, and polybutylene terephthalate; commodity plastics such as polyvinyl chloride, polyethylene, polypropylene, polystyrene, ABS, and polymethyl methacrylate; thermoplastics such as phenol resin, urea resin, melamine resin, epoxy resin, unsaturated polyester, silicon resin, and polyurethane; and the like. The resin can be a resin composition which further contains another component such as a surface treatment agent.

One of the adherends for sandwiching the resin composition (A) can be a heat conductive member which contains metal. Examples of a material of the heat conductive member encompass metals themselves such as aluminum, an aluminum alloy, copper, a copper alloy, iron, an iron alloy, nickel, tin, lead, gold, silver, and silicon; and a thermal conductor in which metal is contained in the resin or the resin composition with a high concentration in order to give electrical conductivity or the like.

The high concentration means that the resin or the resin composition contains metal as a main component. The description "contains metal as a main component" means to contain metal not less than 50% by weight relative to 100% by weight (i.e., total weight) of the resin or the resin composition and the metal.

Embodiment 4

In a resin composition curing method in accordance with Embodiment 4, the at least one adherend is a heat conductive member that contains metal, and the method includes a step (c) of heating at least the heat conductive member, a step (d) of applying the resin composition (A) to the surface of the heat conductive member which has been subjected to the step (c) and/or applying the resin composition (A) to the surface of the another adherend, and a step (e) of attaching the surface of the heat conductive member, which has been subjected to the step (d), to the surface of the another adherend, and the steps (c), (d), and (e) are carried out before the step (a) so that the resin composition (A) is sandwiched between the surface of the at least one adherend and the surface of the another adherend.

With regard to the heat conductive member containing metal, the description in Embodiment 3 applies. Moreover, as a material of the another adherend, it is possible to preferably use, for example, any of the resins and the resin compositions containing the resins which are described in Embodiment 3.

In the step (c), at least the heat conductive member is heated. In a case where bonding is carried out with use of (i) the heat conductive member containing metal as an adherend and (ii) the resin composition (A) as in Embodiment 4, it is possible that the epoxy resin contained in the resin composition (A) is cured by carrying out the step (a), and consequently the resin composition (A) is cured, and thus the bonding is carried out.

However, in a case where the adherend contains metal, heat given by laser light is more likely to be conducted through the metal. From this, a part of heat (energy) given by irradiation with laser light is not used in a curing reaction, and the curing reaction tends to be slower than a case where the adherend does not contain metal.

In Embodiment 4, the heat conductive member is heated in advance in the step (c), and therefore the heat conductive member is in a state of being given heat energy before irradiation with laser light. This makes it possible to prevent heat given by the laser light from being conducted through the heat conductive member, and it is therefore possible to use most of the heat (energy) given by the laser light for the curing reaction.

The heating can be carried out by, for example, placing the heat conductive member in a constant temperature bath and applying heat energy to the heat conductive member, or the like. The heating is preferably carried out for 30 seconds to 5 minutes while keeping a temperature of an atmosphere in the constant temperature bath at 80° C. to 120° C.

In a case where the another adherend does not contain metal, it is not particularly necessary to heat up the another adherend. However, the heating can be carried out to an extent that an excessive heat load is not exerted.

As above described, it is possible to preferably use, as a material of the another adherend, any of the resins and the resin compositions containing the resins which are described in Embodiment 3. It is preferable that the another adherend does not contain metal but the another adherend can contain metal in an amount in which the metal does not become a main component in the another adherend.

That is, the another adherend may contain less than 50% by weight of metal, relative to 100% by weight (i.e., total weight) of the resin or the resin composition and the metal. In a case where the another adherend contains metal in an amount in which the metal does not become a main component in the another adherend, it is preferable that the another adherend is also subjected to the step (c).

In the step (d), the resin composition (A) is applied to the surface(s) of the heat conductive member and/or the another adherend which have/has been subjected to the step (c). Next, in the step (e), the surface of the heat conductive member which has been subjected to the step (d) is bonded to the surface of the another adherend. Aspects of application and bonding are identical with those described in Embodiment 3. The steps (c) through (e) are carried out before the step (a), and therefore the resin composition (A) is directly and/or indirectly irradiated with laser light after the bonding.

As such, according to Embodiment 4, it is possible to efficiently carry out the curing reaction even in a case where metal and a resin are bonded to each other. As a result, it is possible to firmly bond the metal and the resin together.

Embodiment 5

In a resin composition curing method in accordance with Embodiment 5, the sandwiching is carried out by applying the resin composition (A) between the surface of the at least one adherend and the surface of the another adherend in a part in which at least part of the another adherend is inserted in the surface of the at least one adherend. In Embodiment 5, it is preferable that the at least one adherend is a resin molded product and the another adherend is a terminal. The terminal can be a conventionally known metal terminal.

Figure 2:
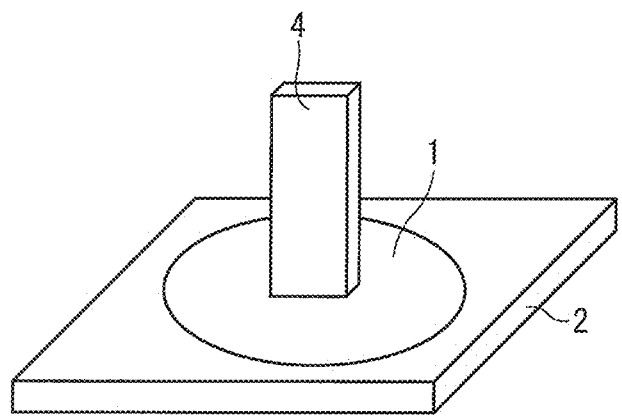
FIG. 2 is a view schematically illustrating a state in which a terminal is bonded to an adherend which is a resin molded product and the terminal is sealed, by a method in accordance with Embodiment 5.

FIG. 2 is a view schematically illustrating a state in which a terminal 4 is bonded to the adherend 2 which is a resin molded product and the terminal 4 is sealed with use of the resin composition (A) 1 by the method in accordance with Embodiment 5. The resin molded product is a product which has been obtained by molding a resin or a resin composition to have an intended shape by a conventionally known molding method such as injection molding.

The "part in which at least part of the another adherend is inserted in the surface of the at least one adherend" (hereinafter, referred to as "inserted part") indicates a part including (i) a recessed part that is formed in the surface of the at least one adherend and corresponds to a diameter of the another adherend and (ii) the at least part of the another adherend which part is inserted in the recessed part.

Figure 3:
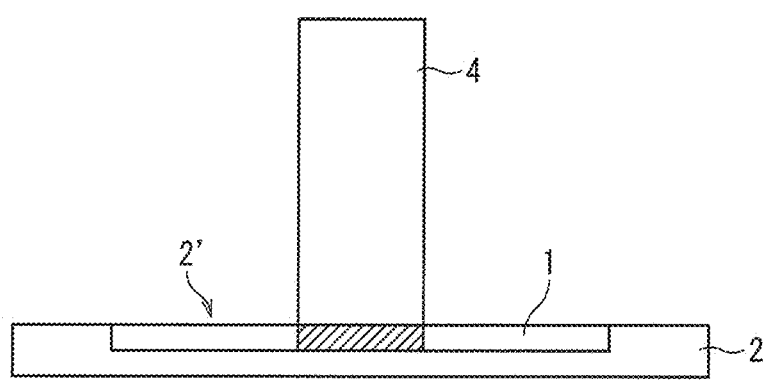
FIG. 3 is a vertical cross-sectional view illustrating the adherend illustrated in FIG. 2 to which the terminal is bonded and sealed.

FIG. 3 is a vertical cross-sectional view illustrating the adherend 2 illustrated in FIG. 2 to which the terminal 4 is bonded and sealed. In FIG. 3, the recessed part is indicated by the reference numeral 2', and the inserted part is indicated by oblique lines in the recessed part 2' and the terminal 4.

In this case, in the inserted part, a bottom surface and a lateral surface of the recessed part 2' in the surface of the adherend 2 corresponds to the "surface of the at least one adherend", and the part of the terminal 4 which part is indicated by the oblique lines corresponds to the "surface of the another adherend".

As illustrated in FIG. 3, the resin composition (A) 1 is applied between the surface of the at least one adherend and the surface of the another adherend, and thus the recessed part 2' is filled with the resin composition (A) 1. As such, the resin composition (A) 1 is sandwiched between the surface of the at least one adherend and the another adherend.

Further, the resin composition (A) 1 is irradiated with laser light in the step (a) so that the resin composition (A) 1 is cured, and thus the terminal 4 can be bonded to the adherend 2 and can be sealed. In this case, the terminal 4 conducts heat given by the laser light, and this makes it possible to completely cure the sandwiched resin composition (A) 1.

A method for carrying out the application of the resin composition (A) is not limited to a particular one, and the resin composition (A) can be supplied to the recessed part 2' with a conventionally known method.

As described later in Examples, in Embodiment 5, it is possible to bond and seal even an adherend, which has a small diameter like a terminal, to the other adherend firmly and without positional displacement. Further, the resin composition (A) can be cured in a short time and therefore, even in a case where the resin molded product to which the terminal is bonded is low in resistance to high temperature, deformation of the resin molded product does not occur. Therefore, the method in accordance with Embodiment 5 can be extremely suitably used in production of electronic components such as a relay and a switch.

In FIGS. 2 and 3, the case is described in which one adherend is bonded to another adherend and sealed. Note, however, that the present invention is of course not limited to this. For example, a person skilled in the art can sufficiently understand that (i) it is possible that a plurality of terminals are bonded to and sealed in one surface of one resin molded product or (ii) it is possible that a plurality of terminals are bonded to and sealed in respective of a plurality of surfaces of a plurality of resin molded products.

The present invention is not limited to the embodiments, but can be altered by a skilled person in the art within the scope of the claims. An embodiment derived from a proper combination of technical means each disclosed in a different embodiment is also encompassed in the technical scope of the present invention.

The present application includes the following invention:

The resin composition curing method in accordance with the present invention includes the step of: (a) irradiating a resin composition (A) with laser light directly and/or indirectly, the resin composition (A) containing (i) an epoxy resin, (ii) an encapsulated curing agent including a core that contains a curing agent and a shell that covers the core, (iii) a filler, and (iv) a color material.

According to the configuration, the encapsulated curing agent is used, and therefore the curing agent contained in the core of the encapsulated curing agent is stable in a state where no energy is applied to the resin composition (A). Then, by directly and/or indirectly irradiating the resin composition (A) with laser light, the encapsulated curing agent is cleaved by energy of the laser light and a curing reaction of the epoxy resin is started by the curing agent contained in the core.

It should be noted that the curing reaction is ended in an extremely short time, i.e., in several seconds, as later described in Examples. This makes it possible to greatly efficiently carry out bonding or sealing between members, without exerting an excessive heat load to members of an electronic component or the like.

It is therefore possible to prevent deformation of members due to heat, decrease in electrical characteristic of a metal part due to gas from the resin composition (A) does not occur, and an electronic component or the like can be efficiently produced.

Moreover, according to the configuration, the curing time is extremely short, and this makes it possible to prevent the foregoing retention of components in the production process. This leads to reduction in size of production facilities, and it is sufficiently possible to employ inexpensive production facilities.

Further, the resin composition (A) is a one-part composition and contains the encapsulated curing agent. From this, the resin composition (A) is stable in quality and has a long work life. Moreover, the resin composition (A) contains the filler and is therefore excellent in rigidity and heat stability. Further, the resin composition (A) contains the color material and is therefore also high in heat absorbing efficiency. From this, according to the configuration, it is possible to stably and easily carry out the curing reaction.

As later described in Examples, a cured product obtained by the configuration has, as bonding quality, extremely high durability.

As above described, the present invention can solve the problems caused in cases where the above described conventional one-part epoxy resin adhesive agent, two-part epoxy resin adhesive agent, UV-curable adhesive agent, instant adhesive agent, and the like are used. Thus, the present invention greatly contributes to increase in efficiency of producing electronic components and in stability of quality.

In the resin composition curing method in accordance with the present invention, it is preferable that a wavelength of the laser light is 600 nm or more and 1500 nm or less.

By using laser light having the wavelength, it is possible to efficiently cleave the encapsulated curing agent. From this, according to the configuration, curing of the resin composition can be carried out more efficiently.

In the resin composition curing method in accordance with the present invention, it is preferable that the core contains one or more curing agents selected from the group consisting of an amine compound, an imidazole compound, and a thiol compound.

The curing agent is a curing agent which is more likely to start a curing reaction of an epoxy resin carried out with laser light which serves as an energy source. According to the configuration, the curing agent is contained in the core, and therefore the curing agent is normally kept in a stable state. In a case where a curing reaction is intended to be started, the resin composition (A) is directly and/or indirectly irradiated with laser light, and thus the reaction can be started at a low temperature and in a short time. As such, by using the resin composition which contains the core including the curing agent, it is possible to more efficiently cure the resin composition.

In the resin composition curing method in accordance with the present invention, it is preferable that the filler is one or more fillers selected from the group consisting of fused silica, crystalline silica, and glass beads.

The filler is contained in order to improve rigidity and heat stability of the resin composition (A). Among those, fused silica, crystalline silica, and glass beads are fillers having high transparency. Therefore, in a case of being irradiated with laser light, it is possible to greatly inhibit reflection of light, as compared with a normal white filler. From this, by using the filler, it is possible to not only improve rigidity and heat stability of the resin composition (A) but also proceed with the curing reaction by laser light more efficiently.

In the resin composition curing method in accordance with the present invention, it is preferable that the color material is one or more color materials selected from the group consisting of carbon black, a pigment, and a dye, the pigment and the dye being different from carbon black.

The color material is contained so that the resin composition (A) can efficiently absorb heat of laser light. Among those, carbon black is suitable for attaining this object in a case where a thickness of the resin composition (A) is relatively small, and the pigment and the dye different from carbon black are suitable for attaining this object in a case where a thickness of the resin composition (A) is relatively large.

Therefore, according to the configuration, it is possible to effectively cause the heat to be absorbed inside the resin composition (A) in accordance with the thickness of the resin composition (A), and this makes it possible to sufficiently carry out a curing reaction in a short time.

In the resin composition curing method in accordance with the present invention, it is preferable that the resin composition (A) contains one or more flame retardants selected from the group consisting of a bromine flame retardant, a phosphorus flame retardant, a nitrogen flame retardant, a chlorine flame retardant, an antimony compound flame retardant, an aluminium hydroxide flame retardant, and a magnesium hydroxide flame retardant.

According to the configuration, it is possible to inhibit excessive heat generation from a surface of the resin composition (A), and this makes it possible to inhibit splash-out during a curing reaction. As such, by using the flame retardant, it is possible to make the most of the resin composition, and this makes it possible to more efficiently carry out a curing reaction.

In the resin composition curing method in accordance with the present invention, it is preferable that the resin composition (A) contains one or more curing assistant agents selected from the group consisting of an amine compound, an imidazole compound, a thiol compound, an acid anhydride compound, and a thermal acid generating agent.

According to the configuration, the curing assistant agent can further facilitate a curing reaction by making use of heat generated by the curing reaction that is caused by the curing agent contained in the encapsulated curing agent. As such, by using the curing assistant agent, it is possible to efficiently carry out a curing reaction in a shorter time.

The resin composition curing method in accordance with the present invention preferably further includes the step of: (b) applying energy to the resin composition (A) directly or indirectly after the step (a), the energy being different from that of the laser light.

According to the configuration, it is possible to assist the curing reaction caused by irradiation with laser light, and therefore the curing method including the step (b) is effective in a case where the curing reaction is intended to be more completely carried out or in a case where the resin composition that is applied in a large area is to be cured.

In the resin composition curing method in accordance with the present invention, it is preferable that the resin composition (A) is sandwiched between a surface of at least one adherend and a surface of another adherend which is different from the at least one adherend.

In this case, the resin composition (A) is sandwiched between the at least one adherend and the another adherend, and it is therefore possible to bond these adherends together by directly and/or indirectly irradiating the resin composition (A) with laser light.

Therefore, the curing method makes it possible to bond these adherends together in a short time while restricting a heat load. From this, the curing method can extremely efficiently carry out, for example, bonding of members in an electronic component and can greatly contribute to increase efficiency in producing the electronic component.

In the resin composition curing method in accordance with the present invention, it is preferable that the sandwiching is carried out by applying the resin composition (A) to the surface of the at least one adherend and attaching the surface of the another adherend to the surface of the at least one adherend on which surface the resin composition (A) has been provided.

According to the configuration, the resin composition (A) is sandwiched between the surface on which the resin composition (A) has been provided and the surface of the another adherend. From this, there is a case where the resin composition (A) cannot be directly irradiated with laser light from the outside.

However, the laser light can pass through the adherend and therefore, even in such a case, it is possible to sufficiently carry out a curing reaction in the curing method by, for example, emitting laser light toward the adherend from above the adherend.

In the resin composition curing method in accordance with the present invention, it is preferable that the at least one adherend is a heat conductive member that contains metal: and the method further includes the steps of: (c) heating at least the heat conductive member; (d) applying the resin composition (A) to the surface of the heat conductive member which has been subjected to the step (c) and/or applying the resin composition (A) to the surface of the another adherend; and (e) attaching the surface of the heat conductive member to the surface of the another adherend after the step (d), the steps (c), (d), and (e) being carried out before the step (a) so that the sandwiching is carried out.

According to the configuration, it is possible to prevent heat of the laser light from being conducted in the heat conductive member, and the heat can be mostly used in the curing reaction. As such, by using the curing method including the above described features, for example, it is possible to more efficiently bond a metal component and a resin molded product together, and the like.

In the resin composition curing method in accordance with the present invention, it is preferable that the sandwiching is carried out by applying the resin composition (A) between the surface of the at least one adherend and the surface of the another adherend in a part in which at least part of the another adherend is inserted in the surface of the at least one adherend.

Moreover, in the resin composition curing method in accordance with the present invention, the at least one adherend is a resin molded product, and the another adherend is a terminal.

According to the configuration, it is possible to seal a member (such as terminal), which is inserted in a resin molded product, in an extremely short time while restricting a heat load. As such, by using the curing method including the above described features, it is possible to efficiently carry out bonding or sealing of members while flexibly adapting to a shape of a member.

EXAMPLES

The following description will discuss further details of the present invention with reference to Examples. Note, however, that the present invention is not limited to the Examples.

Production Example

Adhesive agents A through C, α, and β were prepared by putting raw materials, which are for each of the adhesive agents A through C, α, and β having respective compositions indicated in Table 1, into a container, then manually stirring the raw materials for three minutes with use of a glass rod, and then stirring the raw materials with use of a planetary centrifugal mixer (manufactured by THINKY CORPORATION: Awatori Rentaro ARE-310) under conditions of 3-minute rotation and 3-minute revolution. The adhesive agents A through C fall under the above described resin composition (A). The adhesive agents α and β are comparative adhesive agents used in Comparative Examples. Note that a unit of values in Table 1 is parts by weight.

TABLE 1

| Raw Materials | A | B | C | α | β |
|---|---|---|---|---|---|
| AER250 (Bisphenol A epoxy resin) | 100 | 100 | 100 | 100 | 100 |
| Dicyandiamide | | | | 20 | |
| AJICURE PN-23 (Epoxy resin imidazole adduct compound) | | 5 | | | |
| NOVACURE HX-3722 (Encapsulated curing agent) | 20 | 20 | 20 | | |
| Silica | 10 | 10 | 10 | 10 | 10 |
| Carbon black | 1 | 1 | | 1 | 1 |
| Black iron oxide | | | 1 | | |
| ADEKA OPTOMER CP77 (Thermal cationic polymerization initiator) | | | | | 2 |

In Table 1, AER (Registered Trademark) 250 (manufactured by Asahi Kasei E-Materials Corporation) was bisphenol A diglycidyl ether. As dicyandiamide, OMICURE (Registered Trademark) DDA5 (manufactured by PTI JAPAN LTD.) was used. Dicyandiamide was used as a general curing agent which was a component of the comparative adhesive agent α.

AJICURE (Registered Trademark) PN-23 (manufactured by Ajinomoto Fine-Techno Co., Inc.) was an epoxy resin imidazole adduct compound and used as a curing assistant agent.

NOVACURE (Registered Trademark) HX-3722 (manufactured by Asahi Kasei E-Materials Corporation) was an encapsulated curing agent in which (i) a core was aromatic polyamine, (ii) a first shell was a reaction product of aromatic polyamine, a bisphenol A epoxy resin, and a bisphenol F epoxy resin, (iii) a second shell was a reaction product of the first shell, a bisphenol A epoxy resin, and a bisphenol F epoxy resin.

As silica, FB-5D (manufactured by DENKI KAGAKU KOGYO KABUSHIKI KAISHA) was used. The silica was fused silica. As carbon black which was an inorganic pigment, Mitsubishi carbon black MA7 (manufactured by Mitsubishi Chemical Corporation) was used. As black iron oxide which was an inorganic pigment, BL-100 (manufactured by DAITO KASEI KOGYO CO., LTD.) was used. ADEKA OPTOMER (Registered Trademark) CP77 (manufactured by ADEKA CORPORATION) was a thermal cationic polymerization initiator which starts curing by heat.

Example 1

First, with a method described below, the adhesive agent A prepared in Production Example was applied to a plate made of polybutylene terephthalate (PBT), and thus an adhesive-agent-applied sample was prepared.

Figure 4:
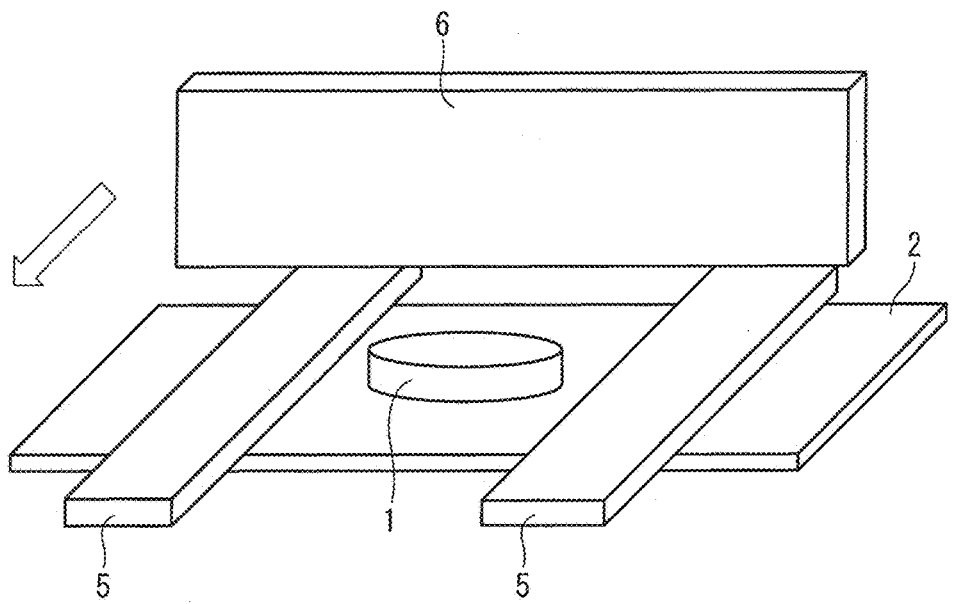
FIG. 4 is a view schematically illustrating a method for preparing an adhesive-agent-applied sample.

FIG. 4 is a view schematically illustrating a method for preparing an adhesive-agent-applied sample. First, 0.1 g of the adhesive agent A (indicated by the reference numeral 1 in FIG. 4) corresponding to the resin composition (A) used in the present invention was dripped onto a PBT plate 2 (adherend) having a thickness of 100 µm. Further, 200-µm thickness gauges (manufactured by Morimoto Yasohachi Shoten Co., Ltd.) 5 were placed on both sides of the adhesive agent A, and then the adhesive agent A was squeegeed with a slide glass 6. Thus, a sample was obtained in which the adhesive agent A was applied with a thickness of 200 µm.

Next, the sample of the adhesive agent A was irradiated, from above, with laser light having a diameter of 10 mm and an output of 6 W for 10 seconds so that an area to be irradiated with the laser light became larger than an area in which the adhesive agent A was applied. In that case, a laser apparatus (manufactured by Jenoptik Japan Co. Ltd., JOLD-30-FC-12 808) for emitting laser light having a wavelength of 808 nm was used.

Subsequently, a cured state of a surface of the sample was confirmed with use of a spatula, and it was confirmed that the surface was entirely cured. Moreover, a degree of cure of the sample was evaluated by FT-IR, and it was confirmed that, as a result of evaluation of the degree of cure, a curing reaction rate was 90% or higher.

Evaluation of the degree of cure was carried out by the following method for measuring a curing reaction rate. That is, the curing reaction rate was obtained by comparing, between before and after curing, absorbance peak areas of a particular functional group in the adhesive agent sample. A relation between a peak area of the particular functional group and a curing reaction rate was as follows:

Curing reaction rate(%)=(absorbance peak area of glycidyl group after curing/absorbance peak area of methylene group after curing)/(absorbance peak area of glycidyl group before curing/absorbance peak area of methylene group before curing)

For measuring the absorbance peak area, a FT-IR (model: system2000, manufactured by PerkinElmer, Inc.) provided with golden diamond ATR was used. With regard to absorbance areas of the glycidyl group and the methylene group, an absorbance peak area of the glycidyl group (in the vicinity of absorption site of 910 cm$^{-1}$) and an absorbance peak area of the methylene group (in the vicinity of absorption site of 2900 cm$^{-1}$) were adopted. In general, a cured state in which a curing reaction rate is 80% is considered as being sufficiently reacted.

In that case, an amount of deformation (amount of warpage) of the PBT plate was measured, and deformation was approximately 50 µm. As such, it was possible to cure the adhesive agent in a short time without largely deforming the member. The amount of deformation in curing was obtained by the following method for measuring an amount of deformation.

Figure 5:
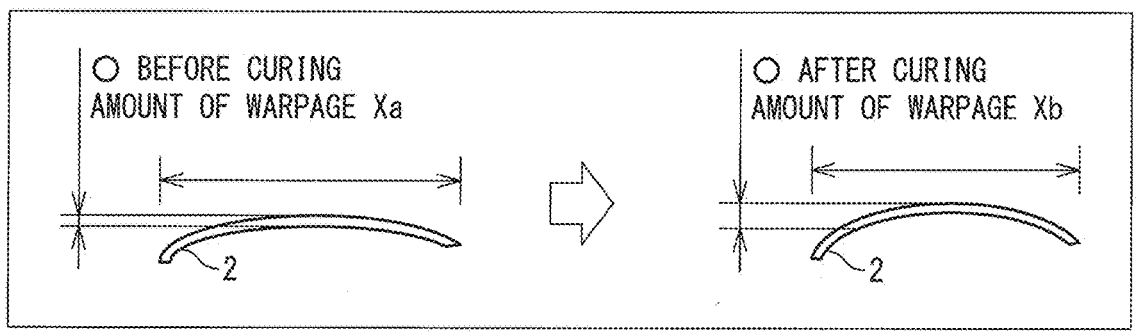
FIG. 5 is a view schematically illustrating amounts of warpage of a PBT plate (adherend) before and after curing.

That is, an amount of warpage of the PBT plate which warpage had been increased between before and after curing was measured, and thus the amount of deformation in curing was obtained. FIG. 5 is a view schematically illustrating amounts of warpage of a PBT plate (adherend) before and after curing. In FIG. 5, the PBT plate (adherend) is indicated by the reference numeral 2.

As illustrated in FIG. 5, an amount of warpage of the PBT plate was defined as a difference between a maximum value and a minimum value of height positions obtained by scanning a cross section of the PBT plate. Further, the amount of deformation in curing is obtained by the following formula.

Amount of deformation in curing=amount of warpage ($Xb$) after curing−amount of warpage ($Xa$) before curing The amount of warpage was measured with use of a surface roughness meter (SURFCOM, manufactured by Tokyo Seimitsu Co., Ltd.) under the following conditions. The measurement was carried out three times, and an average value was adopted:
T speed: 3.0 mm/s
Cutoff value: 0.8 mm
V-MAG: 100, H-MAG: 1
TILT CORR, FLAT-ML
Polarity: Positive Comparative Example 1

The comparative adhesive agent α prepared in Production Example was applied to a PBT plate as with the adhesive agent A, and thus a sample in which the comparative adhesive agent α was applied was prepared.

Next, the sample was placed in a small resin curing oven (UA-2, manufactured by TEIPI THERMAL ENGINEERING CO., LTD.) which was an IR oven, and curing was carried out for 30 minutes at an atmosphere temperature of 120° C. in the curing oven. As a result, a surface of the sample was confirmed, and thus entire curing was confirmed, as with Example 1.

A degree of cure was evaluated, and it was confirmed that a curing reaction rate was approximately 90%. However, in that case, an amount of deformation of the PBT plate was 500 μm or more. That is, a heat load on the member was large, and an adverse effect, i.e., significant deformation of the member was caused by carrying out thermal curing of the comparative adhesive agent α with use of the curing oven.

As such, it was found that the comparative adhesive agent α which was a conventional one-part epoxy resin composition needed to be kept at a high temperature for curing, and this caused deformation of the member due to an excessive heat load.

Comparative Example 2

The comparative adhesive agent α and the comparative adhesive agent β were applied to a PBT plate having a thickness of 100 μm as with Example 1, and were then irradiated with laser light having a diameter of 10 mm and an output of 6 W for 10 seconds with use of the laser apparatus (manufactured by Jenoptik Japan Co. Ltd., JOLD-30-FC-12 808) which emitted laser light having a wavelength of 808 nm.

A surface state of the comparative adhesive agent α was confirmed with use of a spatula, and it was found that a liquid part remained and most of the comparative adhesive agent α was not cured. Moreover, a degree of cure was evaluated, and a curing reaction rate was 15%. With regard to a surface state of the comparative adhesive agent β, many tucks were seen on the surface. A degree of cure was similarly evaluated, and a curing reaction rate was 54%.

By comparing these results and the result of Example 1 of the present invention, it was confirmed that the curing reaction rate in Example 1 was significantly higher, and thus the present invention had superiority. That is, the comparative adhesive agent α and the comparative adhesive agent β which were normal one-part epoxy resin adhesive agents could not be cured by laser light, and it was found out that the effect of the present invention was brought about by irradiating the resin composition (A) specified in the present invention with laser light.

Example 2

A process similar to that of Example 1 was carried out, except that the adhesive agent B prepared in Production Example was used and the curing time (i.e., laser light irradiation time) was changed from 10 seconds to 7 seconds. A degree of cure was evaluated with use of the FT-IR, and it was confirmed that a curing reaction rate was 94%. An amount of deformation (i.e., amount of warpage) of the PBT plate was confirmed, and deformation was approximately 50 μm. As such, the adhesive agent could be cured in a short time without greatly deforming the member.

In Example 2, the imidazole compound was further added as an assistive curing agent, and therefore more excellent curing could be carried out in a time shorter than that in Example 1.

Example 3

A process similar to that of Example 1 was carried out, except that 0.3 g of the adhesive agent C prepared on the slide glass in Production Example was applied to a PBT plate and thus an adhesive-agent-applied sample was prepared, and laser light irradiation conditions were a diameter of 1 mm, an output of 10 W, and an irradiation time of 7 seconds. A thickness of the adhesive agent C was 500 μm.

Figure 6:
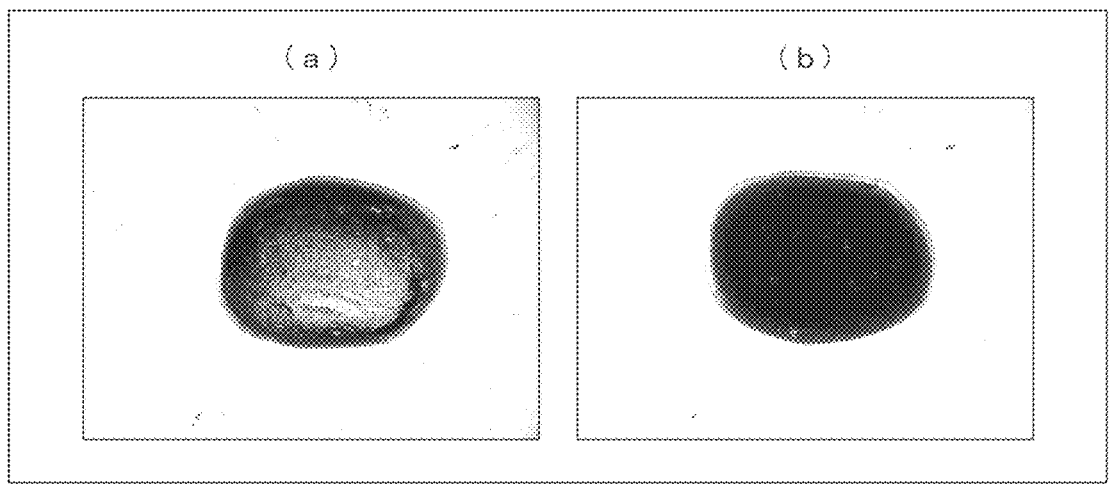
FIG. 6 is a view illustrating results of observing cured states of an adhesive agent C used in Example 3 on a front side and on a back side of the adhesive agent C.

FIG. 6 is a view illustrating results of observing cured states of the adhesive agent C observed on a front side and on a back side of the adhesive agent C. (a) of FIG. 6 shows a cured state on a front surface side, and (b) of FIG. 6 shows a cured state on a rear surface side. As illustrated in FIG. 6, cured states of the front side and the back side of the adhesive agent C were observed after the above process, and it was confirmed that both the front side and the back side of the adhesive agent were cured. Further, an interface between the adhesive agent C and the slide glass was pressed with a spatula, and the adhesive agent was not peeled off. As such, it was confirmed that a curing reaction was sufficiently carried out inside the adhesive agent C.

Next, a process similar to that of Example 1 was carried out, except that 0.3 g of the adhesive agent A prepared on the slide glass in Production Example was applied to a PBT plate and thus an adhesive-agent-applied sample was prepared, and laser light irradiation conditions were a diameter of 1 mm, an output of 10 W, and an irradiation time of 7 seconds. A thickness of the adhesive agent A was identical with that of the adhesive agent C, i.e., 500 μm.

Figure 7:
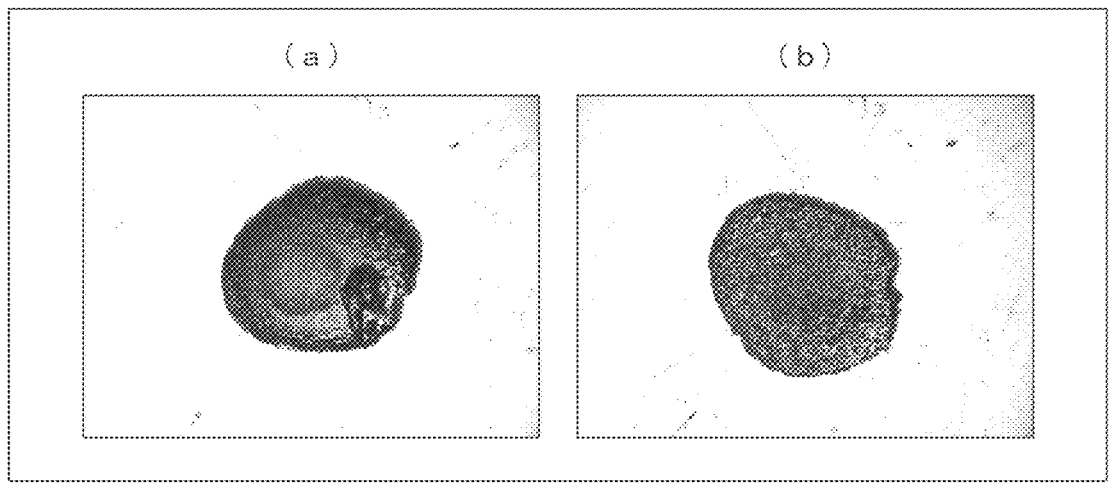
FIG. 7 is a view illustrating results of observing cured states of an adhesive agent A used in Example 3 on a front side and on a back side of the adhesive agent A.

FIG. 7 is a view illustrating results of observing cured states of the adhesive agent A observed on a front side and on a back side of the adhesive agent A. (a) of FIG. 7 shows a cured state on a front surface side, and (b) of FIG. 7 shows a cured state on a rear surface side.

As illustrated in FIG. 7, cured states of the front side and the back side of the adhesive agent A were observed after the above process, and it was confirmed that the front side was cured but the back side of the adhesive agent partially remained in a liquid state, and the inside of the adhesive agent was not cured.

Further, an interface between the adhesive agent A and the slide glass was pressed with a spatula, and the adhesive agent was peeled off.

Such a difference in result between the cases where the adhesive agent C and the adhesive agent A were subjected to identical conditions seemed to occur because of the following reasons: that is, in the adhesive agent A which had the thickness of Example 3 and contained carbon black as a color material, the carbon black was more likely to absorb heat on a surface of the adhesive agent A, and therefore laser light did not sufficiently reach a deep part.

On the other hand, in the adhesive agent C in which black iron oxide was used as a color material, the black iron oxide did not have a characteristic of easily absorbing heat on the surface, unlike carbon black. Therefore, even with the thickness of the adhesive agent in Example 3, laser light could sufficiently reach a deep part.

However, even in a case where the adhesive agent A containing carbon black was used, the 90% or higher curing reaction rate was exhibited in Example 1 in which the thickness was 200 μm. That is, in a case where the resin composition (A) containing carbon black is used, it can be said that the effect of the present invention can be easily and sufficiently brought about by adjusting a thickness (film thickness) of the resin composition (A) to smaller than 300 μm, while taking into consideration the characteristic of carbon black.

In a case where the thickness is smaller than 300 μm, carbon black can greatly improve a heat-absorbing property of the resin composition (A), and a curing reaction may be further facilitated, as compared with a case where a pigment or a dye different from carbon black.

As such, a color material to be used can be appropriately selected when the resin composition (A) is prepared, by taking into consideration a necessary thickness of the resin composition (A).

Example 4

To a PBT plate having a thickness of 100 µm, 0.1 g of the adhesive agent B prepared in Production Example was applied with a thickness of 100 µm and pressed from above with a polycarbonate (PC) plate having a thickness of 100 µm. That is, to a surface of the PBT plate (adherend) on which surface the resin composition (A) had been provided, a surface of the PC plate which was an adherend different from the PBT plate was attached, and thus the resin composition (A) was sandwiched between the surfaces.

Next, laser light was emitted from above the PC plate under conditions identical with those of Example 1. After that, an operation of manually peeling the PBT plate off from the PC plate was tried but the PBT plate was not peeled off from the PC plate. Thus, curing of the adhesive agent B could be confirmed. Moreover, deformations of the PBT plate and the PC plate were measured and were both found to be approximately 50 µm.

As such, also in a case where the resin composition (A) was sandwiched between the surfaces and was indirectly irradiated with laser light, it was confirmed that the resin composition (A) could be cured and the adherends could be bonded together. Moreover, from the result that the PBT plate and the PC plate were hardly deformed, it was confirmed that the present invention could be applied to members having low resistance to high temperature while hardly causing deformation.

Comparative Example 3

To a PBT plate having a thickness of 100 µm, 0.1 g of the comparative adhesive agent α prepared in Production Example was applied with a thickness of 100 µm and pressed from above with a PC plate having a thickness of 100 µm. Next, curing was carried out with use of a small resin curing oven (UA-2) at 120° C. for 30 minutes.

As a result, although the PBT plate and the PC plate were bonded together, the PC plate was largely deformed and lost its original shape. As such, in such a conventional curing/bonding method (i.e., curing by heat using a one-part epoxy resin), the member having low resistance to high temperature was deformed because the member was exposed to a high-temperature environment for a long time, and it was thus found that merely an insufficient result could be obtained.

Example 5

A hole having a size of 1 mm×1 mm was formed in a PBT plate having a thickness of 1 mm, and a terminal having a size of 0.7 mm×0.7 mm×1 cm was put through the hole. Further, 0.1 g of the adhesive agent B prepared in Production Example was put on a spatula and applied (as if squeezed) between (i) a bottom surface and a lateral surface of the hole and (ii) a lateral surface of the terminal (i.e., into a space formed by the bottom surface and the lateral surface of the hole and the lateral surface of the terminal).

Next, laser light was emitted from above the PBT plate under conditions identical with those of Example 1. Then, whether or not the adhesive agent B was cured was checked by manually moving the terminal, and it was confirmed that the adhesive agent B was completely cured. A position of the terminal was checked, and it was found that an angle of the terminal with respect to the bottom surface was 90°, which was not greatly changed from an angle immediately after the adhesive agent B was applied.

In an electronic apparatus, positional accuracy of a component greatly influences a product performance. In the method in accordance with the present invention, the resin composition (A) could be quickly cured even in a case where the PBT plate having low resistance to high temperature and the terminal were bonded together, and the resin composition (A) after curing was not deformed thereafter. From this, it was found that the method in accordance with the present invention could maintain high positional accuracy.

Example 6

Figure 8:
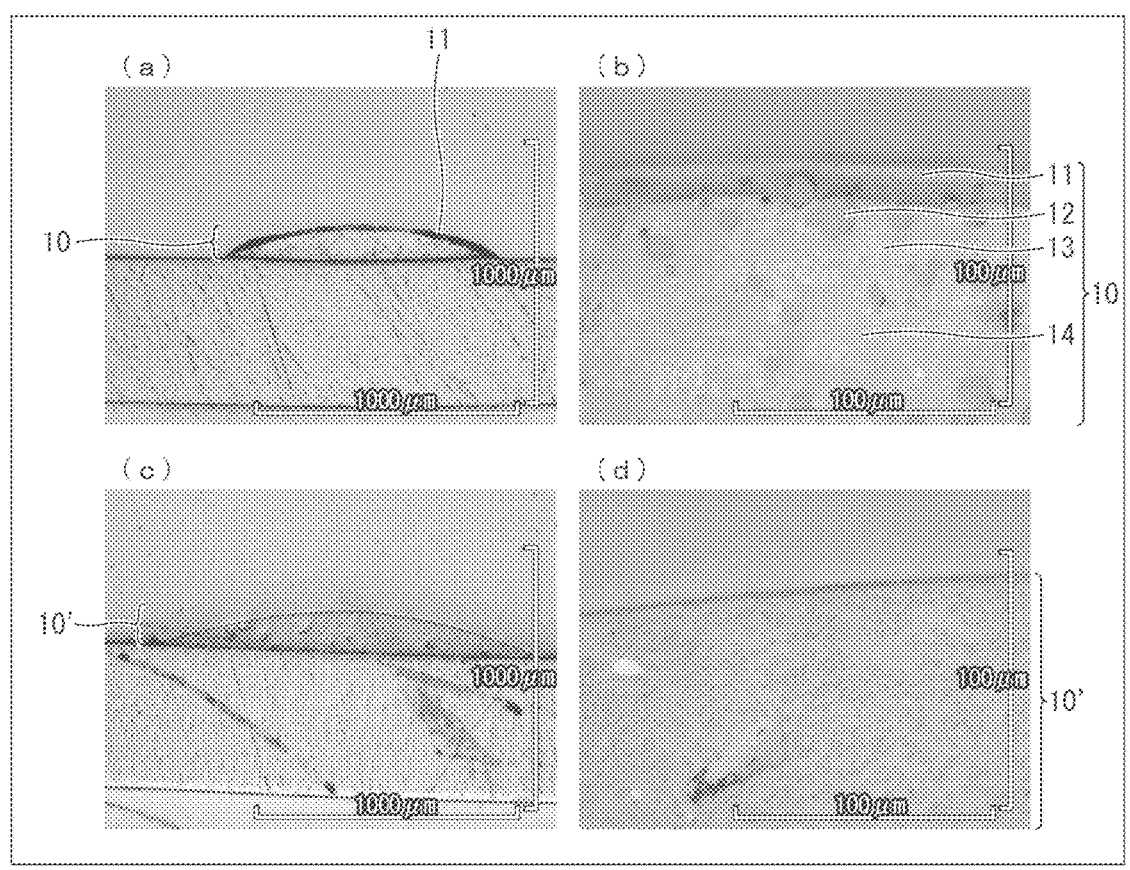
FIG. 8 is a view illustrating results of observing a vertical cross section of a cured product of an adhesive-agent-applied sample.

FIG. 8 is a view illustrating results of observing a vertical cross section of a cured product of an adhesive-agent-applied sample. (a) and (b) of FIG. 8 show results of observing, with a microscope (BX-60M, manufactured by Olympus Corporation), a vertical cross section (prepared by polishing) of a cured product 10 of the applied adhesive agent B obtained in Example 2. (a) of FIG. 8 shows a result of observing the vertical cross section with a magnification of 50 times, and (b) of FIG. 8 shows a result of observing the vertical cross section with a magnification of 500 times.

(c) and (d) of FIG. 8 show results of observing a vertical cross section of a cured product 10' of an applied adhesive agent (referred to as "adhesive agent γ") obtained by a method described below. (c) of FIG. 8 shows a result of observing the vertical cross section with a magnification of 50 times, and (d) of FIG. 8 shows a result of observing the vertical cross section with a magnification of 500 times, as with (a) and (b) of FIG. 8.

That is, 100 parts by weight of the AER250, 5 parts by weight of the AJICURE PN-23, 20 parts by weight of the NOVACURE HX-3722, 20 parts by weight of the silica, and 3 parts by weight of the carbon black were put in a container, and an adhesive agent was thus prepared by a method similar to that of Production Example. Then, 0.1 g of the adhesive agent was dripped onto a PBT plate, and a sample of the applied adhesive agent γ was obtained by a method similar to that of Example 1.

Next, the sample was placed in a small resin curing oven (UA-2, manufactured by TEIPI THERMAL ENGINEERING CO., LTD.) which was an IR oven, and heated up for 6 minutes at an atmosphere temperature of 120° C. in the curing oven.

In FIG. 8, reference numerals 10 and 10' indicate cured products of resin compositions. Specifically, the reference numeral 10 indicates a cured product of the sample obtained by applying the adhesive agent B, and the reference numeral 10' indicates a cured product of the sample obtained by applying the adhesive agent γ. The reference numerals 11 and 14 indicate cured products of epoxy resins, the reference numeral 12 indicates glass beads, and the reference numeral 13 indicates carbon black.

As shown in (d) of FIG. 8, the cured product 10' obtained by irradiating the resin composition (A) with an infrared ray did not have a definite outermost surface layer. On the other hand, as shown in (b) of FIG. 8, the cured product 10 which had been obtained by curing the resin composition (A) by the method in accordance with the present invention had a definite outermost surface layer with a thickness, and the outermost surface layer contained, as a main component, a cured product 11 of the epoxy resin.

As such, unlike the cured product 10' obtained by irradiating the resin composition (A) with an infrared ray, the cured product 10 exhibited a unique phenomenon that the outermost surface layer contained, as a main component, the cured product of the epoxy resin.

For example, in a case where the resin composition (A) is used as an adhesive agent, rigidity is essential for bonding with high quality. However, if external force is applied to a cured product of the resin composition (A) and the external force reaches an inner part of an adhesive layer (i.e., inside of the cured product) having high rigidity, a crack is more likely to occur in the cured product, and the cured product is easily peeled off.

Moreover, an outermost surface layer of the adhesive agent is more likely to receive external force. In a case where the outermost surface layer contains a cured product of an epoxy resin as a main component, it can be expected that the outermost surface layer may mitigate the external force while maintaining rigidity of the adhesive agent. Further, in that case where the outermost surface layer contains a cured product of an epoxy resin as a main component, improvements in humidity resistance and in insulating property can be expected.

INDUSTRIAL APPLICABILITY

The present invention can be suitably used in bonding and the like of members in electronic components such as a relay and a switch. From this, the present invention can be widely used in the overall electronic industry.

REFERENCE SIGNS LIST

1: Resin composition (A)
2: Adherend
3: Another adherend
4: Terminal
10: Cured product of resin composition (A)

The invention claimed is:

1. A method for curing a resin composition, said method comprising the step of:
   (a) irradiating a resin composition (A) with laser light directly and/or indirectly, the resin composition (A) containing (i) an epoxy resin, (ii) an encapsulated curing agent including a core that contains a curing agent and a shell that covers the core, (iii) a filler, and (iv) a color material,
   the filler being one or more fillers selected from the group consisting of fused silica, crystalline silica, and glass beads,
   an amount of the filler being not less than 10 parts by weight and not more than 70 parts by weight relative to 100 parts by weight of the epoxy resin,
   the resin composition (A) being sandwiched between a surface of at least one adherend and a surface of another adherend which is different from the at least one adherend, and
   the at least one adherend being a heat conductive member that contains metal; wherein
   the method further includes the steps of:
   (c) heating at least the heat conductive member;
   d) applying the resin composition (A) to the surface of the heat conductive member which has been subjected to the step (c) and/or applying the resin composition (A) to the surface of the another adherend; and
   (e) attaching the surface of the heat conductive member to the surface of the another adherend after the step (d),
   the steps (c), (d), and (e) being carried out before the step (a) so that sandwiching is carried out.

2. The method as set forth in claim 1, wherein a wavelength of the laser light is 600 nm or more and 1500 nm or less.

3. The method as set forth in claim 1, wherein:
   the curing agent, which is contained in the core, is one or more curing agents selected from the group consisting of an amine compound, an imidazole compound, and a thiol compound.

4. The method as set forth in claim 1, wherein:
   the color material is one or more color materials selected from the group consisting of carbon black, a pigment, and a dye, the pigment and the dye being different from carbon black.

5. The method as set forth in claim 1, wherein:
   the resin composition (A) contains one or more flame retardants selected from the group consisting of a bromine flame retardant, a phosphorus flame retardant, a nitrogen flame retardant, a chlorine flame retardant, an antimony compound flame retardant, an aluminium hydroxide flame retardant, and a magnesium hydroxide flame retardant.

6. The method as set forth in claim 1, wherein:
   the resin composition (A) contains one or more curing assistant agents selected from the group consisting of an amine compound, an imidazole compound, a thiol compound, an acid anhydride compound, and a thermal acid generating agent.

7. The method as set forth in claim 1, further comprising the step of:
   (b) applying energy to the resin composition (A) directly or indirectly after the step (a), the energy being different from that of the laser light.

* * * * *